(12) United States Patent
Sharifi et al.

(10) Patent No.: US 10,424,321 B1
(45) Date of Patent: Sep. 24, 2019

(54) AUDIO DATA CLASSIFICATION

(71) Applicant: Google LLC, Mountain View, CA (US)

(72) Inventors: Matthew Sharifi, Santa Clara, CA (US); Dominik Roblek, Ruschlikon (CH)

(73) Assignee: Google LLC, Mountain View, CA (US)

( * ) Notice: Subject to any disclaimer, the term of this patent is extended or adjusted under 35 U.S.C. 154(b) by 1581 days.

(21) Appl. No.: 13/932,158

(22) Filed: Jul. 1, 2013

Related U.S. Application Data

(60) Provisional application No. 61/763,668, filed on Feb. 12, 2013.

(51) Int. Cl.
```
G10L 25/48      (2013.01)
G06F 17/00      (2019.01)
G10H 1/00       (2006.01)
G10L 25/81      (2013.01)
```

(52) U.S. Cl.
CPC .............. *G10L 25/81* (2013.01); *G10L 25/48* (2013.01); *G06F 17/00* (2013.01); *G10H 1/0025* (2013.01)

(58) Field of Classification Search
CPC . G06F 17/30743; G06F 17/00; G10H 1/0025; G10H 1/36; G10L 25/48; G10L 25/81
USPC ....................................................... 704/201
See application file for complete search history.

(56) References Cited

U.S. PATENT DOCUMENTS

| | | | |
|---|---|---|---|
| 2003/0101050 A1* | 5/2003 | Khalil ................. | G10L 25/81 704/216 |
| 2004/0231498 A1* | 11/2004 | Li ..................... | G06F 17/30743 84/634 |
| 2010/0004926 A1* | 1/2010 | Neoran ................ | G10L 25/48 704/201 |
| 2010/0170382 A1* | 7/2010 | Kobayashi ........... | G10H 1/0025 84/613 |
| 2011/0173208 A1 | 7/2011 | Vogel | |
| 2011/0307085 A1 | 12/2011 | Selby et al. | |
| 2014/0148932 A1* | 5/2014 | Castro ................. | G06F 17/00 700/94 |
| 2014/0338515 A1* | 11/2014 | Sheffer ............... | G10H 1/36 84/609 |

OTHER PUBLICATIONS

"Shazam (service)", Shazam Entertainment Ltd., downloaded from the internet on Jun. 28, 2013, https://en.wikipedia.org/wiki/Shazam_(service), 7 pages.
"SoundHound", downloaded from the Internet on Jun. 28, 2013, https://en.wikipedia.org/wiki/Soundhound, 4 pages.

* cited by examiner

*Primary Examiner* — Farzad Kazeminezhad
(74) *Attorney, Agent, or Firm* — Fish & Richardson P.C.

(57) ABSTRACT

Methods, systems, and apparatus, including computer programs encoded on a computer storage medium, for analyzing an audio sample to determine whether the audio sample includes music audio data. One or more detectors, including a spectral fluctuation detector, a peak repetition detector, and a beat pitch detector, may analyze the audio sample and generate a score that represents whether the audio sample includes music audio data. One or more of the scores may be combined to determine whether the audio sample includes music audio data or non-music audio data.

30 Claims, 18 Drawing Sheets

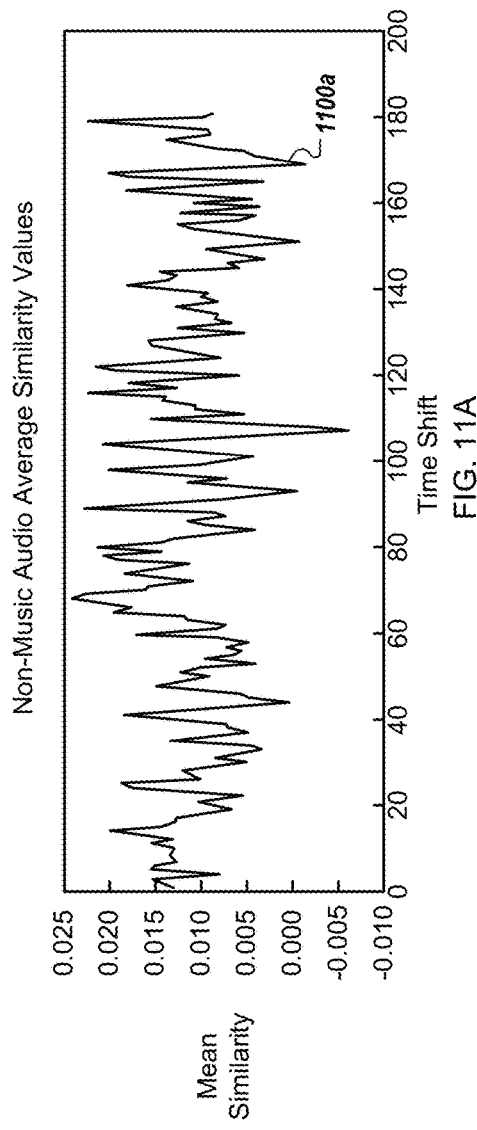
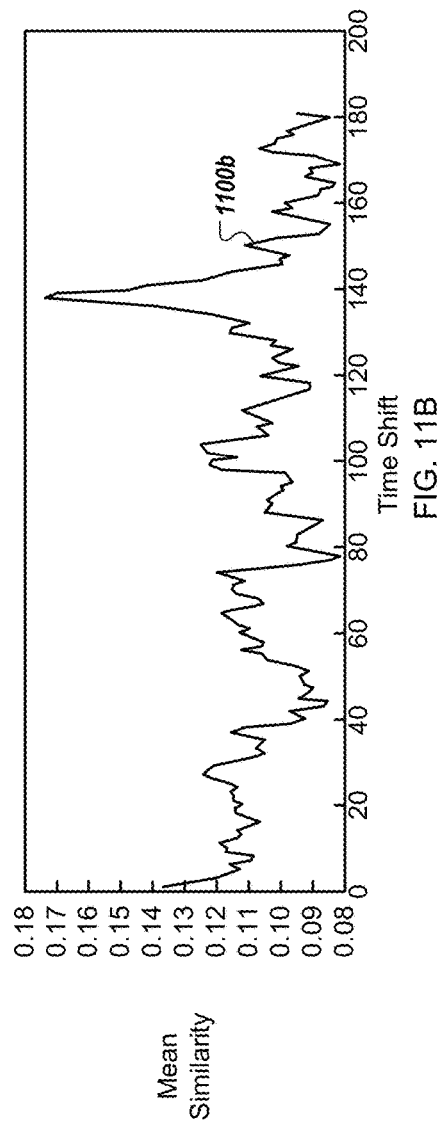
FIG. 11A
FIG. 11B

AUDIO DATA CLASSIFICATION

CROSS-REFERENCE TO RELATED APPLICATION

This application claims the benefit of U.S. Provisional Application Ser. No. 61/763,668, filed on Feb. 12, 2013, which is incorporated by reference.

TECHNICAL FIELD

The present specification relates to classifying audio data, and more specifically, classifying audio data as music audio data or non-music audio data.

BACKGROUND

An individual may hear a song on the radio or in a public establishment, and may want to later acquire the song by purchasing the song from an online music distribution service.

SUMMARY

According to some innovative aspects of the subject matter described in this specification, an audio sample is analyzed to determine whether the audio sample includes music. For example, a user may be in a coffee house that is playing background music. The user may be interested in learning more information about the music, such as a song name or artist title associated with background music. The user can interact with a mobile computing device, e.g., a smartphone, to facilitate determining such information. The mobile computing device can detect the audio data, e.g., the background music, encode the audio data as waveform data, and provide the waveform data to a server-based computing environment.

Innovative aspects of the subject matter described in this specification may be embodied in methods that include the actions of receiving an audio sample that is associated with audio data, computing a spectrogram of the received audio sample, detecting one or more beats in the spectrogram, detecting one or more sustained pitches in the spectrogram around the beats, determining, for each of the beats, a score based on the sustained pitches around the beat, and determining a beat pitch score that indicates the likelihood that the audio sample contains music audio data, the beat pitch score based on the scores for each of the beats.

Another aspect of the subject matter described in this specification may be embodied in methods that include the actions of receiving an audio sample that is associated with audio data, computing a spectrogram of the received audio sample, determining an average spectral envelope of the spectrogram, determining one or more differences between adjacent values in the average spectral envelope, and determining a spectral fluctuation score that indicates the likelihood that the audio sample contains music audio data, the spectral fluctuation score based on the differences between adjacent values in the average spectral envelope.

Another aspect of the subject matter described in this specification may be embodied in methods that include the actions of receiving an audio sample that is associated with audio data, computing a spectrogram of the received audio sample, the spectrogram including one or more spectral slices, determining, for each of the spectral slices in the spectrogram, one or more peaks, determining, for each of the spectral slices in the spectrogram, a similarity between the spectral slice and the other spectral slices in the spectrogram based on the peaks, determining, for each time shift between slices in the spectrogram, a mean similarity value based on the similarity values associated with the time shift, generating a projection from the mean similarity values, smoothing the projection, determining a density of one or more local peaks in the smoothed projection, and determining a peak repetition score that indicates the likelihood that the audio sample contains music audio data based on the density of the one or more local peaks in the smoothed projection.

Other embodiments of these aspects include corresponding systems, apparatus, and computer programs, configured to perform the actions of the methods, encoded on computer storage devices.

These and other embodiments may each optionally include one or more of the following features. For instance, detecting the one or more beats in the spectrogram may comprise determining one or more horizontal peaks in the spectrogram, generating a sparse representation of the spectrogram based on the horizontal peaks, and detecting the one or more beats in the sparse spectrogram. In some implementations, detecting the one or more sustained pitches in the spectrogram around the beats comprises determining one or more vertical peaks in the spectrogram, and detecting the one or more sustained pitches in the spectrogram around the beats based on the vertical peaks in the spectrogram around the beats. In some implementations, the method further comprises comparing the beat pitch score to a beat pitch threshold, and determining that the audio sample contains music audio data based on the beat pitch score being greater than the beat pitch threshold. In some implementations, determining, for each of the beats, the score based on the sustained pitches around the beat comprises determining, for each of the beats, one or more windows associated with the beat, each window centered on the beat, associated with a row in the spectrogram, and having the same predetermined width, determining, for each of the windows, a quantity of vertical peaks in the window, and determining, for each of the beats, a highest score associated with the beat, the highest score based on the highest quantity of vertical peaks in one of the windows associated with the beat, wherein the score for each of the beats comprises the highest score for the beat.

In some implementations, the method further comprises correcting the spectral tilt of the spectrogram. In some implementations, computing the spectrogram comprises creating a plurality of frequency bins for the audio sample, and generating the spectrogram from the frequency bins. In some implementations, the method further comprises filtering one or more frequency bands from the spectrogram.

In some implementations, the method further comprises normalizing one or more intensity values of each spectral slice of the spectrogram to create a normalized spectrogram, wherein determining the average spectral envelope of the spectrogram comprises determining the average spectral envelope of the normalized spectrogram. In some implementations, the spectral fluctuation score comprises the mean of the one or more differences. In some implementations, the mean of the one or more differences comprises the mean of the absolute values of the differences between adjacent values in the average spectral envelope. In some implementations, the method further comprises approximating a first derivative of the average spectral envelope in the frequency dimension, wherein determining the one or more differences between adjacent values in the average spectral envelope comprises determining the one or more differences between adjacent values in the average spectral envelope based on the first derivative of the average spectral envelope. In some implementations, the method comprises determining an average squared magnitude of the audio sample, and comparing the average squared magnitude of the audio sample to a threshold value, wherein computing the spectrogram is based on determining that the average squared magnitude of the audio sample is greater than the threshold value.

In some implementations, the method comprises generating a sparse representation of the spectrogram based on the peaks, wherein determining, for each of the spectral slices in the spectrogram, a similarity between the spectral slice and the other spectral slices in the spectrogram comprises determining a similarity between the spectral slice and the other spectral slices in the sparse spectrogram. In some implementations, the peaks comprise amplitude peaks. In some implementations, the method further comprises filtering one or more mean similarity values from the projection, wherein smoothing the projection comprises smoothing the filtered projection. In some implementations, the peak repetition score is based on a maximum of the filtered projection, a sample standard deviation of the filtered projection, and the density of the one or more local peaks in the smoothed projection. In some implementations, the one or more mean similarity values are filtered based on the time shifts associated with the one or more mean similarity values.

The subject matter described in this specification may be implemented in various implementations to realize one or more of the following potential advantages. In some implementations when the linear classifier runs on a device with limited resources, a model used by the linear classifier to represent an audio sample may be small to conserve resources. In some implementations when the linear classifier runs on a device with limited resources, the generation of the model might not be computationally expensive to conserve the resources of the device, e.g., battery power. In some implementations, classification of audio samples using the model might not be computationally expensive to conserve the resources of the device, e.g., battery power.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF DRAWINGS

FIGS. 7-11B are example heatmap projections.

Like reference numbers and designations in the various drawings indicate like elements.

DETAILED DESCRIPTION

Figure 1:
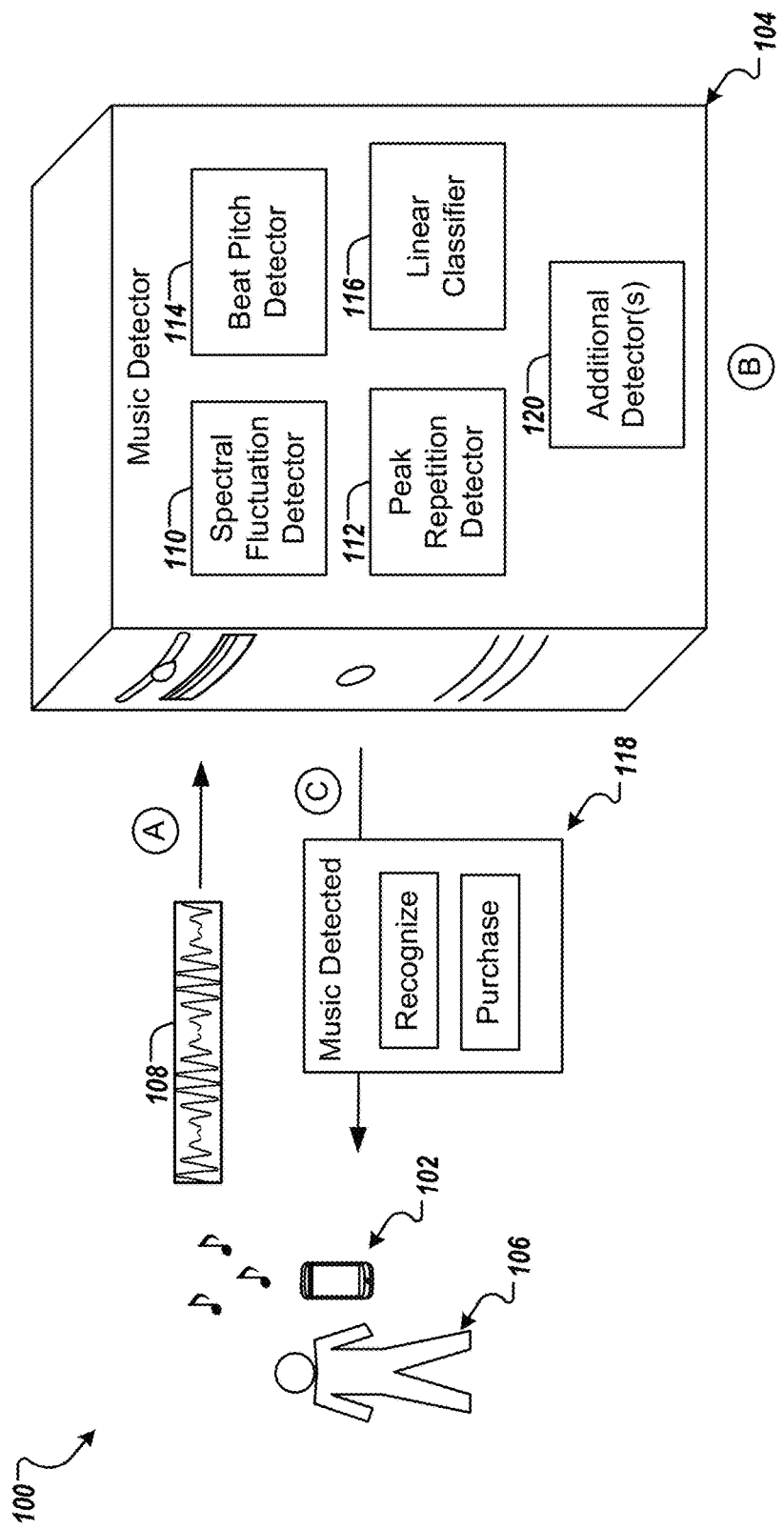
FIG. 1 depicts a system for classifying audio data.

FIG. 1 depicts a system 100 for classifying audio data. The system 100 can determine whether audio data includes music audio data or non-music audio data. The system 100 includes a mobile computing device 102 and a music detector engine 104. The mobile computing device 102 is in communication with the music detector engine 104 over one or more networks. The mobile computing device 102 can include a microphone, a camera, or other detection mechanisms for detecting environmental data associated with a user 106. In some implementations, the mobile computing device 102 includes at least a portion, or all, of the music detector engine 104. For example, the mobile computing device 102 implements the music detector engine 104 for classifying audio data.

In some examples, the user 106 is sitting at a coffee house that is playing music in the background. In the illustrated example, the user 106 would like to know more information about the music, e.g., the name of the song or the artist of the song. To that end, the mobile computing device 102 can facilitate determining information about the environmental audio data, e.g., the background music.

Specifically, the mobile computing device 102 detects the environmental audio data and processes the detected environmental audio data to generate waveform data 108. The waveform data 108 represents the detected environmental audio data. The mobile computing device 102 can transmit the waveform data 108 to the music detector engine 104, e.g., over a network, during operation (A). In some examples, the waveform data 108 is streamed from the mobile computing device 102 to the music detector engine 104.

In some implementations, the environmental audio data can include an utterance that is generated by the user 106. For example, the utterance may include a question posed by the user such as "What is this song?" In some examples, when the environmental audio data includes the utterance generated by the user 106, the waveform data 108 can represent the detected utterance and the environmental audio data.

In some examples, when the environmental audio data includes the utterance generated by the user 106, the mobile computing device 102 detects the environmental audio data after detecting the utterance; detects the environmental audio data concurrently with detecting the utterance; or both.

In some implementations, the mobile computing device 102 can initiate detection of the environmental audio data in response to interaction by the user with the mobile computing device 102. Specifically, the mobile computing device 102 can begin detection of the environmental audio data in response to launching an application on the mobile computing device 102, e.g., through selection of a graphical representation of the application or selection of a physical button of the mobile computing device 102 that is associated with the application, e.g., "double-clicking" a "home" button.

In some implementations, the mobile computing device 102 detects the environmental audio data, e.g., the background music, continuously. In some examples, the mobile computing device 102 may detect the environmental audio data in the background. For example, the mobile computing device 102 may detect the environment audio data when the user 106 is interacting with a mobile application of the mobile computing device 102, e.g., the user 106 is checking e-mail. In another example, the mobile computing device 102 may detect the environmental audio data when the mobile computing device 102 is in a "locked" state, e.g., the mobile computing device 102 is powered-on but not being actively used.

In some implementations, the mobile computing device 102 detects the environment audio data, e.g., the background music, in response to an instruction from the user 106, e.g., user-directed interaction. For example, the mobile computing device 102 detects the environmental audio data in response to the user 106 providing instructions through a graphical user interface of the mobile computing device 102, e.g., the user executing a mobile application of the mobile computing device 102. Further, the mobile computing device 102 may detect the environmental audio data in response to the user 106 providing instructions that are included by the utterance, i.e., the utterance includes verbal instructions to detect the environmental audio data. In some examples, the mobile computing device 102 can continuously detect utterances, e.g., continuously detect utterances in the background. In some examples, the mobile computing device 102 can detect the utterances in response to the user 106 executing a mobile application for detecting utterances.

In some implementations, the mobile computing device 102 detects the environmental audio data, e.g., the background music, in a continuous stream of audio samples with low latency. Specifically, the mobile computing device 102 detects the environmental audio data by detecting one or more audio samples of the environmental audio data over one or more time periods, e.g., a "window of length." For example, the mobile computing device 102 detects a first audio sample of the environmental audio data over a time period $t_1$ and a second audio sample of the environmental audio data over a time period $t_2$. In some examples, the magnitude of the time periods $t_1$ and $t_2$ substantially differ, e.g., are of different time lengths. In some examples, the magnitude of the time periods $t_1$ and $t_2$ are substantially the same, e.g., are of the same time length.

In some examples, a portion, or all, of the second audio sample coincides with, e.g., overlaps, a portion, or all, of the first audio sample. For example, a portion, or all, of the time period $t_2$ coincides with, e.g., overlaps, a portion, or all, of the time period $t_1$. In some examples, the second audio sample occurs substantially after the first audio sample. For example, the time period $t_2$ occurs after the time period $t_1$.

In some examples, as the length of the audio sample increases, i.e., the time length associated with the audio sample increases, an accuracy of determining a state of the environmental audio, e.g., whether the environmental audio data is associated with music audio data or non-music audio data, also increases. In some examples, the mobile computing device 102 detects multiple audio samples, e.g., four audio samples, each of differing time lengths, e.g., 0.5 seconds, 1.1 seconds, 2.5 seconds, and 5 seconds.

In some implementations, the mobile computing device 102 provides multiple audio samples to the music detector engine 104 until the music detector engine 104 determines whether the audio samples contain music or non-music or until the music detector engine 104 determines information about music included in the audio samples, e.g., the name of the song in the audio samples, or the artist of the song. For example, the mobile computing device 102 provides a 0.5 second audio sample and a 1.1 second audio sample to the music detector engine 104 and, prior to sending a 2.5 second audio sample, the mobile computing device 102 receives music information from the music detector engine 104 and does not provide the 2.5 second audio sample, or another, e.g., longer, audio sample, to the music detector.

In some examples, the mobile computing device 102 detects the environmental audio data, e.g., the background music, utilizing increasing window lengths, i.e., increasing time lengths. In some examples, the increasing window lengths are exponentially increasing window lengths of the environmental audio data. For example, the mobile computing device 102 detects multiple audio samples, e.g., four audio samples, each of increasing time lengths, e.g., 0.5 seconds, 1.1 seconds, 2.5 seconds, and 5 seconds.

In some examples, the mobile computing device 102 detects the environmental audio data using sliding time windows. That is, the mobile computing device 102 continuously detects audio samples having overlapping time periods. For example, new audio samples of the environmental audio data are detected as the time windows are shifted, e.g., sliding, and a new score, e.g., used to determine whether the environmental audio data includes music audio data or non-music audio data, as described further below, is determined for each audio sample associated with each new time window. For example, the sliding window can be 1.1 seconds.

The music detector engine 104 receives the waveform data 108 from the mobile computing device 102. The music detector engine 104 processes the waveform data 108, during operation (B). For example, the music detector engine 104 identifies a state of the environmental audio data, i.e., whether the environmental audio data includes music audio data or non-music audio data. In some examples, non-music audio data can include speech, talking, noise, or other ambient non-music noises.

Specifically, the music detector engine 104 includes a spectral fluctuation detector 110, a peak repetition detector 112, a beat pitch detector 114, a linear classifier 116, and/or one or more additional detectors 120. In some examples, based on the length of time associated with an audio sample of the environmental audio data, the spectral fluctuation detector 110, the peak repetition detector 112, the beat pitch detector 114, or all three, identify the state of the environmental audio data, e.g., whether the environmental audio data includes music audio data or non-music audio data.

The additional detectors 120 may be used to determine whether the environmental audio data includes music audio data or non-music audio data. For example, a frame entropy detector may be used to determine the spectral slice entropy over a time window, as discussed in more detail below. Further, the music detector engine 104 may include an energy entropy detector, a spectral centroid detector, and a zero crossing rate detector, to name a few examples of the additional detectors 120.

The linear classifier 116 receives input from the detectors, including the spectral fluctuation detector 110, the peak repetition detector 112, and/or the beat pitch detector 114, and determines the state of the environmental audio data. The linear classifier 116 may also receive input from one or more music information detectors that the linear classifier 116 uses to determine information about music included in the environmental audio data, e.g., a song name or an artist name.

In some implementations, the music detector engine 104 compares a time length of the audio sample with a threshold duration. Based upon the comparison, the music detector engine 104 employs the spectral fluctuation detector 110, the peak repetition detector 112, the beat pitch detector 114, another detector, or a combination of detectors, to identify the state of the environment audio data, e.g., whether the environmental audio includes music audio data or non-music audio data.

In some examples, when the time length of the audio sample is less than the threshold duration, the music detector engine 104 may employ the spectral fluctuation detector 110 to identify whether the environmental audio data includes music audio data or non-music audio data. For example, the spectral fluctuation detector 110 can be used to determine whether the environmental audio data includes music audio data or non-music audio data when the time length of the audio sample is short, e.g., 0.5 seconds-1.5 seconds.

In some examples, when the length of time of the audio sample is greater than the threshold duration, the music detector engine 104 employs the peak repetition detector 112 to identify whether the environmental audio data includes music audio data or non-music audio data. For example, the peak repetition detector 112 can be used to determine whether the environmental audio data includes music audio data or non-music audio data when the time length of the audio sample is longer, e.g., 1.5 seconds or 2.5 seconds.

In some examples, only the peak repetition detector 112 or the beat pitch detector 114 is used to determine whether the environmental audio data includes music audio data or non-music audio data when the time length of the audio sample is longer than a threshold duration, e.g., 2.5 seconds. Alternatively, when the threshold duration is a range, e.g., 0.5 seconds to 2.5 seconds, the music detector engine 104 may employ the spectral fluctuation detector 110, the peak repetition detector 112, and the beat pitch detector 114.

In some implementations, a combination of the spectral fluctuation detector 110, the peak repetition detector 112, the beat pitch detector 114, and/or the additional detectors 120 are used together, e.g., to increase an accuracy of identification of the state of the environmental audio data. For example, the music detector engine 104 weights a score output by each of the spectral fluctuation detector 110, the peak repetition detector 112, and the beat pitch detector 114, in addition to any other music detectors, where each of the scores relates to the likelihood that the audio sample is associated with music audio data. In some examples, the weighting can be based on a length of time of the audio sample.

For example, each of the scores output by the music detectors, e.g., the spectral fluctuation detector 110, the peak repetition detector 112, the beat pitch detector 114, can be used to determine whether the environmental audio data includes music audio data or non-music audio data. For example, the music detector engine 104, the linear classifier 116, or both, can compare the score to a threshold score. In some examples, when the score is greater than or equal to the threshold score, the audio sample, and the corresponding environmental audio data, can be identified as containing music audio data. In some examples, when the score is not greater than the threshold score, the audio sample, and the corresponding environmental audio data, can be identified as containing non-music audio data. In certain implementations, when the score is not greater than the threshold score, the audio sample, and the corresponding environmental audio data, can be identified as not containing recognizable music audio data, e.g., when the intensity or quality of any music audio data included in the audio sample is too low.

In some implementations, one or more of the music detectors computes a score for two or more audio samples of differing time lengths. For example, the audio samples can have time lengths of 2.5 seconds and 5 seconds respectively. In some examples, the maximum score of the scores for two or more audio samples can be determined. Thus, the maximum score can be used to determine whether the environmental audio data includes music audio data or non-music audio data.

The music detector engine 104 provides identification information 118, related to a state of the environmental audio and based on the analyzed audio samples of the environmental audio data, e.g., a determination of whether the environmental audio data includes music audio data or non-music audio data, to the mobile computing device 102, e.g., over a network, at operation (C). Specifically, the music detector engine 104, based on a state determination provided by the linear classifier 116, provides the state identification information 118 of the environmental audio data to the mobile computing device 102. For example, the music detector engine 104 determines that the environmental audio data, e.g., the waveform data 108, corresponds to music audio data. In some examples, the music detector engine 104 can provide such identification information 118 thru an application executed by the mobile computing device 102, or other communication mechanisms such as a text message or an e-mail.

In some examples, when the identification information 118 includes a determination that the environmental audio data includes music audio data, the identification information 118 can include an option to "recognize" the music audio data, e.g., through an application executed by the mobile computing device, and/or an option to "purchase" the song or album associated with the music audio data. In some examples, the identification information 118 can include recognition information associated with the music audio data, e.g., the song name or the artist name.

In some implementations, the identification information 118 can be displayed on the GUI of the mobile computing device 102 in response to user interaction. For example, the user 106 can launch an application of the mobile computing device 102, and in response, the application can provide the identification information 118.

In some implementations, the identification information 118 can be displayed on the GUI of the mobile computing device 102 automatically, i.e., without input from the user 106. For example, the GUI can include, upon transitioning from the "locked" state to an "active state," the identification information 118. In another example, the GUI can include, in the "locked" state, the identification information 118, e.g., the "lock" screen of the GUI can include the identification information 118.

Figure 2:
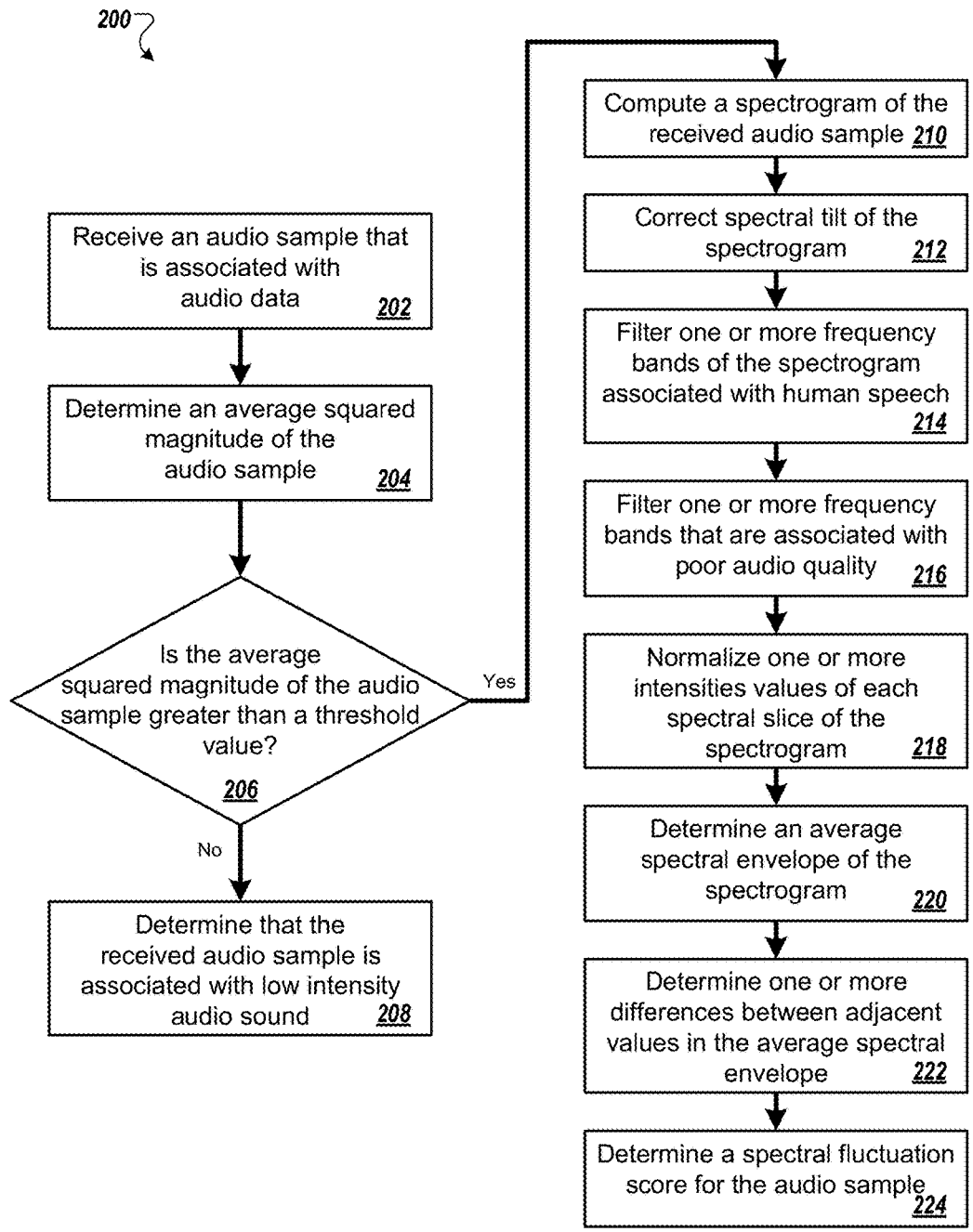
FIGS. 2, 5, and 12 are flow diagrams of processes for determining whether an audio sample contains music audio data.

FIG. 2 is a flow diagram of a process 200 for determining whether an audio sample contains music audio data by measuring the consistency of fluctuations in spectral slices across a time window associated with the time sample. The process 200 can be used by the spectral fluctuation detector 110 from the system 100. For example, the spectral fluctuation detector 110 receives an audio sample, e.g., of the environmental audio data, and detects sustained pitches in the audio sample over a period time, where sustained pitches in audio sample are more likely to occur in music audio data as compared to an audio sample including human speech or other types of non-musical noise.

The spectral fluctuation detector 110 receives an audio sample that is associated with audio data (202). For example, the spectral fluctuation detector 110 receives t seconds of the audio data as the audio sample. In some examples, the audio sample has a length of 1.5 seconds to 10 seconds; however, in some examples, the spectral fluctuation detector 110 can determine whether the audio sample relates to music audio data with audio samples as short as 0.5 seconds.

The spectral fluctuation detector 110 determines an average squared magnitude of the audio sample (204). For example, the average squared magnitude of the audio sample represents the intensity of the audio sample and the spectral fluctuation detector 110 uses the average squared magnitude to determine whether the data in the audio sample can be further processed. For example, when the intensity is low, the spectral fluctuation detector 110 determines that the audio sample contains mostly silence and should not be processed further.

The spectral fluctuation detector 110 compares the average squared magnitude of the audio sample to a threshold value (206). For example, the spectral fluctuation detector determines whether the average squared magnitude of the audio sample is greater than the threshold value.

Based upon the comparison, when the average squared magnitude of the audio sample is not greater than the threshold value, the spectral fluctuation detector 110 determines that the received audio sample is associated with low intensity audio sound (208). For example, the spectral fluctuation detector 110 determines that the audio sample contains silence, or sounds with very low intensity. In response, the spectral fluctuation detector 110 ceases processing of the received audio sample, e.g., identifying the state of the environmental audio data.

Based upon the comparison, when the average squared magnitude of the audio sample is greater than the threshold value, the spectral fluctuation detector 110 computes a spectrogram of the received audio sample (210). For example, the spectral fluctuation detector 110 computes a time-varying spectral representation of the received audio sample, such as a spectrogram 300 shown in FIG. 3.

In some implementations, a larger number of horizontal lines in the spectrogram 300, e.g., represented by the light gray and white shading, indicates that the audio sample more likely includes music audio data than if the spectrogram 300 included fewer horizontal lines. For example, the horizontal lines represent sustained tones where music audio data includes more sustained tones than non-music audio data.

In some examples, the spectral fluctuation detector 110 computes the spectrogram of the received audio sample utilizing a fast Fourier transform (FFT). In some examples, an associated window length of the spectrogram is 64 milliseconds and a time step of the spectrogram is 16 milliseconds.

In some implementations, the spectral fluctuation detector 110 computes a chromogram. In some examples, the spectral fluctuation detector 110 utilizes autocorrelation in the processing of the received audio sample.

Returning to FIG. 2, the spectral fluctuation detector 110 corrects spectral tilt of the spectrogram (212). For example, the spectral fluctuation detector 110 adjusts the magnitude values in the spectrogram 300 to correct the spectral tilt and avoid overweighted lower frequencies of the spectrogram by multiplying the magnitude values associated with higher frequencies in the spectrogram 300 by a high constant value and the magnitude values associated with lower frequencies in the spectrogram 300 by a low constant value, where the magnitude values associated with the middle frequencies are multiplied by intermediate constant values. Specifically, the spectral fluctuation detector 110 may multiply each row of the spectrogram with a square root of the zero-based row index, e.g., the square root of the frequency value. As a result, the spectral tilt and the overweighted lower frequencies of the computer spectrogram are corrected, e.g., providing a corrected spectrogram.

The spectral fluctuation detector 110 filters one or more frequency bands of the spectrogram associated with human speech (214). For example, the spectral fluctuation detector 110 filters one or more frequency bands of the corrected spectrogram. In some examples, the spectral fluctuation detector 110 can filter, e.g., remove, frequency bands that are associated with human speech, e.g., mid-range frequencies. For example, the spectral fluctuation detector 110 can filter, e.g., remove, frequency bands in the range of 1400 Hz to 2600 Hz, creating a filtered spectrogram that corresponds to the frequency bands below 1400 Hz and above 2600 Hz.

The spectral fluctuation detector 110 filters one or more frequency bands that are associated with poor audio quality (216). For example, the mobile computing device 102 may be only able to effectively capture environmental audio data above a certain frequency threshold and below a certain frequency threshold, e.g., based on physical limitations of a microphone associated with the mobile computing device 102. Therefore, the spectral fluctuation detector 110 filters, e.g., removes, frequency bands below 120 Hz and above 4300 Hz. Thus, the spectral fluctuation detector 110 may effectively maintain spectrogram rows in the filtered spectrogram that correspond to frequency bands in the ranges of 120 Hz to 1400 Hz and 2600 Hz to 4300 Hz.

The spectral fluctuation detector 110 normalizes one or more intensity values of each spectral slice of the spectrogram (218). For example, the spectral fluctuation detector 110 normalizes the intensity values of each spectral slice of the filtered spectrogram to compensate for high and low volume in the captured environmental audio data represented by the intensity values in the spectrogram. Specifically, the spectral fluctuation detector 110 normalizes each slice of the spectrogram by dividing the intensity values associated with each spectral slice by the harmonic mean of the intensity values of the spectral slices of a selected portion of the spectrogram.

In some examples, the selected portions of the spectrogram can include slices of the spectrogram having intensity values in a top percentile of the intensity values of the spectral slices of the spectrogram, e.g., the top 5% percentile. For example, the spectral fluctuation detector 110 determines the intensity values that have the greatest magnitude in a specific spectral slice and uses the intensity values with the greatest magnitude to normalize the intensity values in the specific spectral slice. Further, the spectral fluctuation detector 110 may determine the harmonic mean of the intensity values with the greatest magnitude and use the harmonic mean value to normalize the intensity values in the specific spectral slice. The spectral fluctuation detector 110 may use alternate methods or values to normalize the intensity values in a specific spectral slice.

In some examples, normalizing the intensity values of each spectral slice of the spectrogram based on a top percentile of the intensity values of the spectral slices of the spectrogram filters, e.g., removes, outlying values of spectral slices of the spectrogram, e.g., "outliers." In some examples, the spectral fluctuation detector 110 normalizes each spectral slice of the spectrogram independently for the lower and the upper spectrogram range, e.g., for the range 120 Hz to 1400 Hz and for the range 2600 Hz to 4300 Hz.

The spectral fluctuation detector 110 determines an average spectral envelope of the spectrogram (220). For example, the spectral fluctuation detector 110 determines a curve, e.g., measured in decibels, in the frequency-amplitude plane of the spectrogram. The spectral fluctuation detector 110 may determine the average spectral envelope for each row 302a-c of the normalized spectrogram and create an average spectral envelope slice or graph from the average spectral envelope for each row 302a-c. For example, the spectral fluctuation detector 110 averages all of the values of points 304a-j for a particular frequency or frequency bin 302a in the normalized spectrogram and uses the average value as the value for the particular frequency or frequency bin 302a in the average spectral envelope graph.

The spectral fluctuation detector 110 may then repeat the process for all of the frequencies or frequency bins 302*a-c* in the normalized spectrogram, or for a subset of discrete frequencies or frequency bins 302*a-c* in the normalized spectrogram.

Figure 4A:
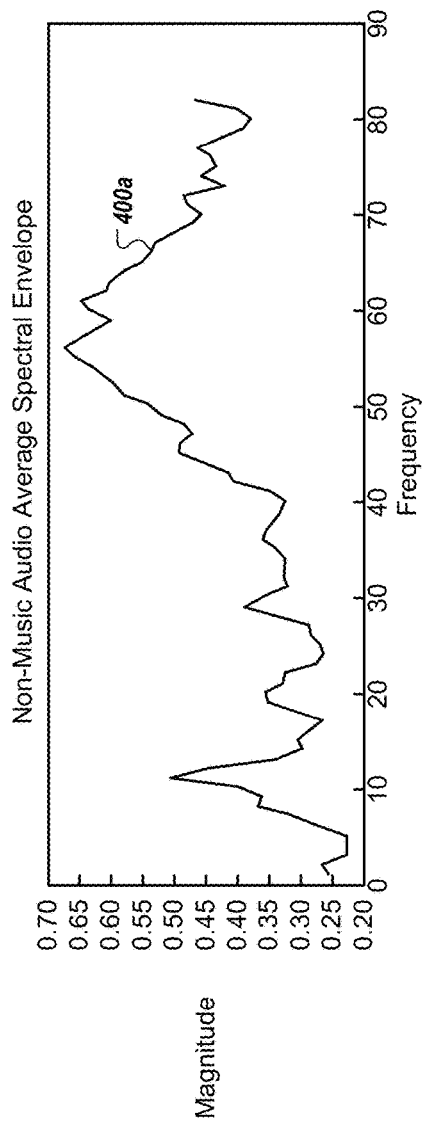
FIGS. 4A-B depict examples of average spectral envelopes.
Figure 4B:
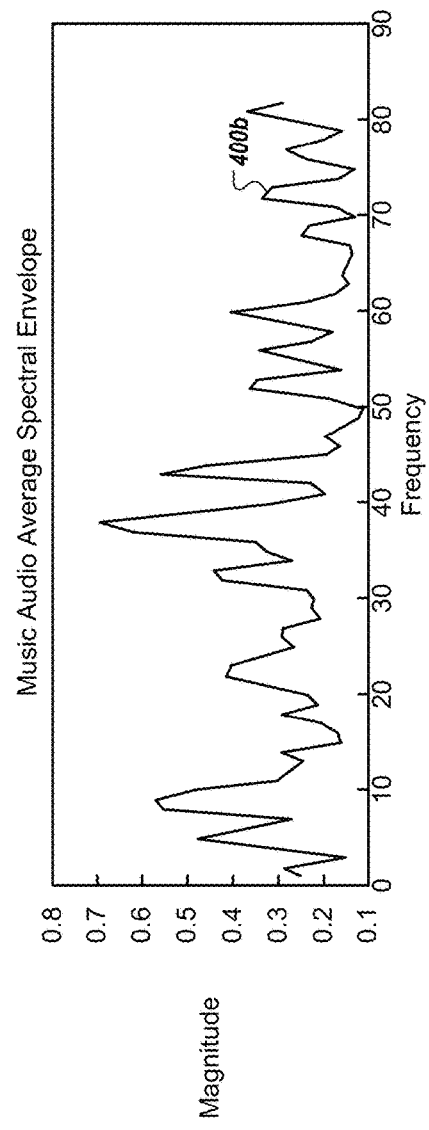

FIGS. 4A-B depict examples of average spectral envelopes. For example, the spectral fluctuation detector 110 may generate a non-music average spectral envelope 400*a*, shown in FIG. 4A, for a non-music audio sample. Alternatively, the spectral fluctuation detector 110 may generate a music average spectral envelope 400*b*, shown in FIG. 4B, for a music audio sample. The average spectral envelopes 400*a-b* are examples based on specific audio samples, and the average spectral envelopes for different audio samples would have a similar appearance to one of the average spectral envelopes 400*a-b*, depending on whether the different audio samples include music audio data or non-music audio data.

In some implementations, the spectral fluctuation detector 110 computes the average spectral envelope independently for a lower range and an upper range of the spectrogram 300. For example, the spectral fluctuation detector 110 may determine the average spectral envelope for the frequency bands in the range of 120 Hz to 1400 Hz and then determine the average spectral envelope for the frequency bands in the range of 2600 Hz to 4300 Hz.

Returning to FIG. 2, the spectral fluctuation detector 110 determines one or more differences between adjacent values in the average spectral envelope (222). For example, the spectral fluctuation detector 110 approximates a first derivate of the average spectral envelope in the frequency dimension. In some examples, the spectral fluctuation detector 110 computes the difference between the adjacent values of the average spectral envelope independently for a lower range, e.g., 120 Hz to 1400 Hz, and an upper range of the spectrogram, e.g., 2600 Hz to 4300 Hz.

The spectral fluctuation detector 110 determines a spectral fluctuation score for the audio sample (224). For example, the spectral fluctuation score is the mean difference based on the differences between adjacent values in the average spectral envelope. For example, the spectral fluctuation detector 110 determines the mean absolute difference of the first derivate of the average spectral envelope to determine the flatness of a vector represented by the average spectral envelope. The spectral fluctuation detector may determine the mean difference based on the absolute values of the differences between adjacent values in the average spectral envelope. The spectral fluctuation detector 110 may use any appropriate algorithm to determine the flatness of the vector represented by the average spectral envelope and use the determined value as a spectral fluctuation score for the audio sample.

Specifically, the spectral fluctuation score is a measure of the consistency of fluctuations in spectral slices of the spectrogram in the input time window. For example, music audio data is more likely than non-music audio data, e.g., human speech, to comprise sustained pitches and associated harmonics that are repeated in a short time period, e.g., 0.5 seconds-10 seconds. Thus, in some examples, the spectral characteristics of music audio data, e.g., pitches and harmonics, can accumulate and become emphasized in the average spectral envelope of the spectrogram. As a result, the average spectral envelope associated with music audio data can be less uniform as compared to an average spectral envelope associated with non-music audio data, e.g., the curve in the frequency-amplitude plane is less uniform for music audio data than non-music audio data.

To that end, the spectral fluctuation score can be used in determining whether the environmental audio data includes music audio data or non-music audio data. For example, the music detector engine 104, the spectral fluctuation detector 110, or both, can compare the spectral fluctuation score to a threshold spectral fluctuation score value. In some examples, when the spectral fluctuation score is greater than the threshold spectral fluctuation score value, the audio sample, and the corresponding environmental audio data, can be identified as containing music audio data. In some examples, when the spectral fluctuation score is not greater than the threshold spectral fluctuation score value, the audio sample, and the corresponding environmental audio data, can be identified as containing non-music audio data.

Additionally, for example, when averaging the spectral characteristics of non-music audio data of individual spectral slices of the spectrogram, i.e., in step 220, the individual spectral slices can "cancel" each other out. Thus, the flatness of the average spectral envelope is related to the spectral fluctuation score that is indicative of the likelihood that the audio sample is a music audio sample. For example, the flatter the average spectral envelope, the lower the score, and thus the lower the likelihood that the audio sample is a music audio sample.

In some implementations, the spectral fluctuation detector 110 may compute the spectral fluctuation score for two or more audio samples, e.g. of the received audio data. For example, the spectral fluctuation detector 110 computes two spectral fluctuation scores for audio samples of length 0.5 seconds and 1.1 seconds. In these implementations, the separate spectral fluctuation scores may be combined or the greater spectral fluctuation score value may be used. For example, the spectral fluctuation detector 110 may combine the two spectral fluctuation score values using weights, e.g., based on the duration of the audio sample. Alternatively, the spectral fluctuation detector 110 may determine which spectral fluctuation score has the greater value, and use the greater spectral fluctuation score as the spectral fluctuation score for the received audio sample.

In some implementations, the output of the spectral fluctuation detector 110 can be combined, e.g., by linear classifier 116, with a mean absolute difference of the lower spectrogram range, a mean absolute difference of the upper spectrogram range, and a sample standard deviation of all differences. For example, the spectral fluctuation detector 110 can combine a spectral fluctuation score for the lower frequency range in the spectrogram with a spectral fluctuation score for the higher frequency range in the spectrogram.

In some implementations, the output of the spectral fluctuation detector 110 is used to classify an audio sample. For example, the linear classifier 116 or the music detector engine 104 may use the spectral fluctuation score to determine information about music included in the environmental audio data, e.g., a song name or an artist name associated with the music. The linear classifier 116 or the music detector engine 104 may use other scores or data in addition to the spectral fluctuation score when classifying the environmental audio data.

The order of the steps in the process 200 described above is illustrative only, and the measuring of the consistency of fluctuations in spectral slices across a time window can be performed in different orders. For example, the spectral fluctuation detector may filter one or more frequency bands that are associated with poor audio quality prior to filtering one or more frequency bands associated with human speech.

In some implementations, the process 200 can include additional steps, fewer steps, or some of the steps can be divided into multiple steps. For example, the spectral fluctuation detector 110 might perform steps 202 and 210 through 224 without performing steps 204 through 208, i.e., determining whether the audio sample is associated with low intensity audio sound. In some implementations, the spectral fluctuation detector 110 does not filter the spectrogram. For example, the spectral fluctuation detector 110 may perform the process 200 without performing step 214 and/or without performing step 216.

Figure 3:
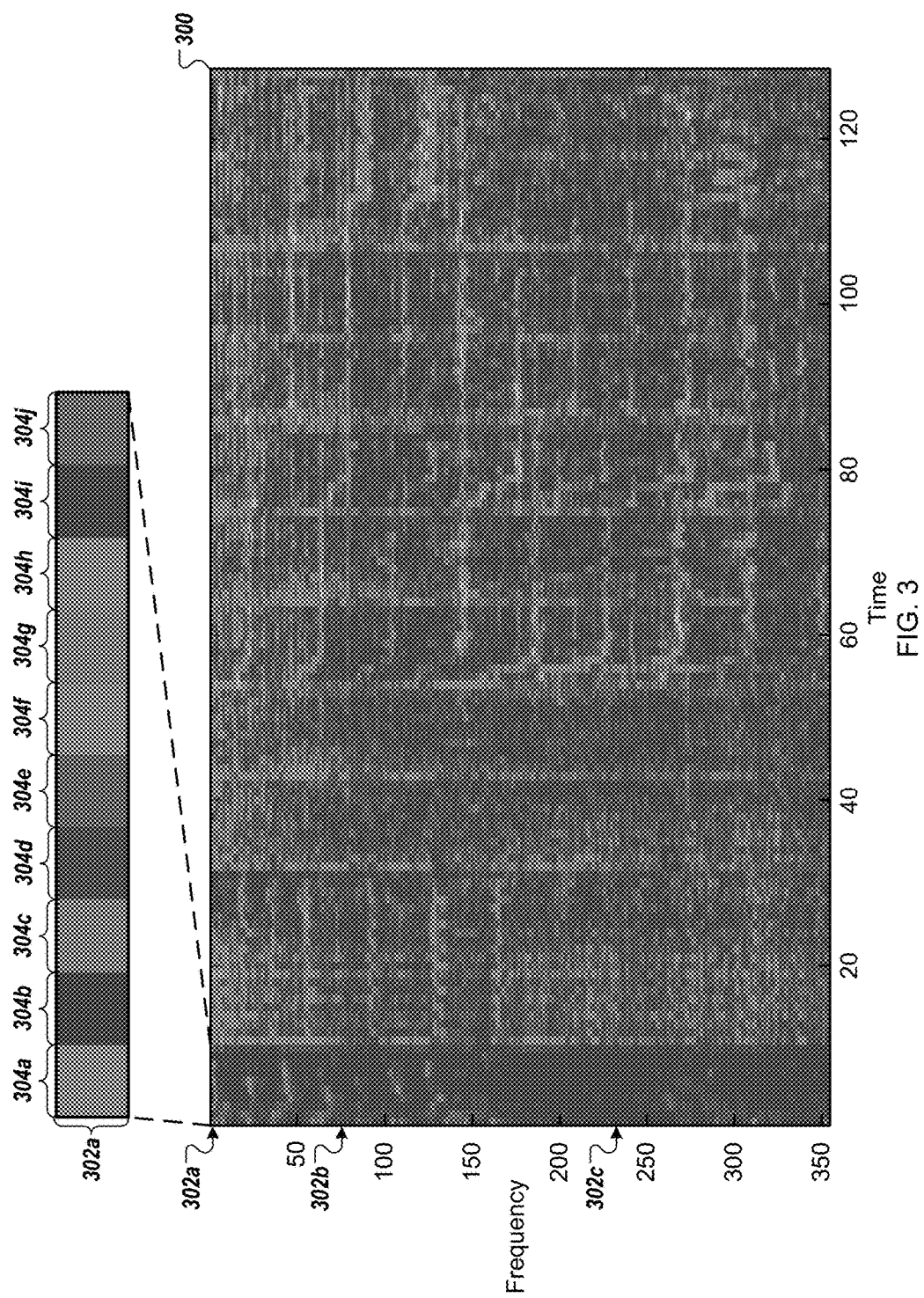
FIGS. 3 and 13-16 are example spectrograms.

In some implementations, the spectral fluctuation detector 110 bins the frequencies in the received audio sample when creating the spectrogram 300 shown in FIG. 3. For example, the spectral fluctuation detector 110 creates a plurality of frequency bins where each frequency bin is approximately 10 Hz, such that the frequency values in the spectrogram 300 represent the frequency bins. In one example, the spectral fluctuation detector 110 creates the frequency bins as part of the fast Fourier Transform process.

Figure 5:
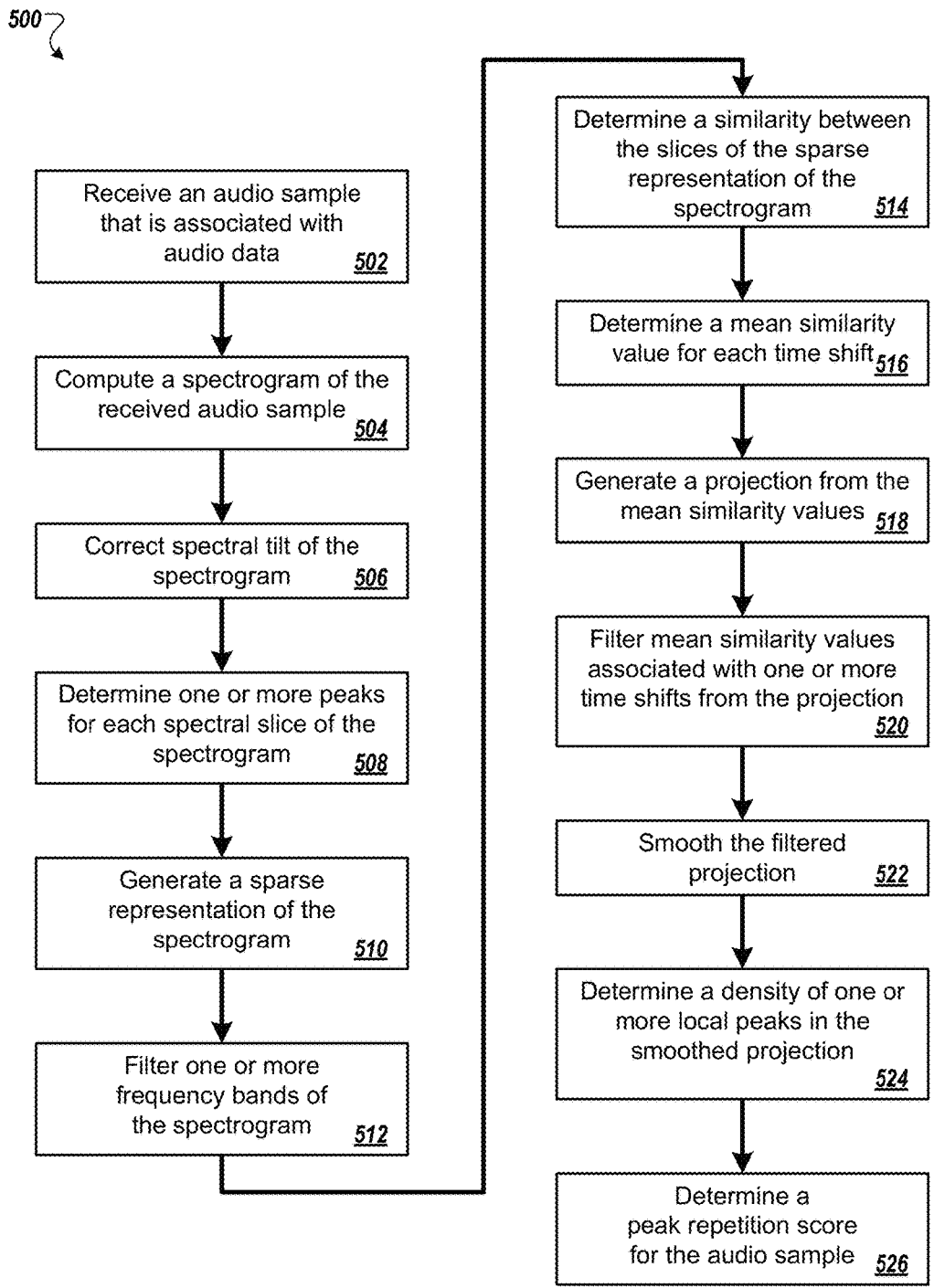

FIG. 5 is a flow diagram of a process 500 for determining whether an audio sample contains music audio data by measuring harmonic repetitions. The process 500 can be used by the peak repetition detector 112 from the system 100. For example, the peak repetition detector 112 may determine whether the audio data includes music audio data or non-music audio data by computing a similarity of harmonics of the audio sample. For example, repetition of harmonics can represent a similarity of musical notes that are unlikely to occur in background noise associated with non-music audio data.

The peak repetition detector 112 receives an audio sample that is associated with audio data (502). For example, the peak repetition detector 112 receives t seconds of the audio data as the audio sample. In some examples, the audio sample is typically of length 1.5 seconds to 10 seconds. In some examples, the audio sample is at least 2.5 seconds long.

In some implementations, the peak repetition detector 112 receives two or more audio samples with a sliding time window. That is, the peak repetition detector 112 continuously receives audio samples having overlapping time periods. For example, the sliding window can be 1.1 seconds.

The peak repetition detector 112 computes a spectrogram of the received audio sample (504). For example, the peak repetition detector 112 determines a time-varying spectral representation of the received audio sample, such as the spectrogram 300 shown in FIG. 3.

In some examples, the peak repetition detector 112 computes the spectrogram of the received audio sample utilizing a fast Fourier transform (FFT). In some examples, an associated window length of the spectrogram is 64 milliseconds and a time step of the spectrogram is 16 milliseconds.

In some implementations, the peak repetition detector 112 computes a chromogram. In some examples, the peak repetition detector 112 utilizes autocorrelation in processing of the received audio sample.

The peak repetition detector 112 corrects spectral tilt of the spectrogram (506). For example, the peak repetition detector 112 corrects the spectral as described above with reference to step 212. Specifically, the peak repetition detector 112 may multiply each row of the spectrogram with the zero-based row index, e.g., the square root of the frequency value. As a result, the spectral tilt of the spectrogram is corrected providing a corrected spectrogram.

The peak repetition detector 112 determines one or more peaks for each spectral slice of the spectrogram (508). For example, the peak repetition detector 112 identifies the peaks of each spectral slice of the corrected spectrogram.

In some implementations, the peaks of each spectral slice of the spectrogram are peaks of the amplitude of a particular frequency at a particular time for each respective spectral slice. In these implementations, the peaks of each spectral slice of the spectrogram 300 may be represented by the color of a point in the spectrogram, i.e., defined by x and y coordinates. For example, a peak is a particular point where all the points that surround the particular point are a different color, e.g., a darker color, than the color of the particular point.

In some implementations, the peaks have a particular value in a single spectrogram column, e.g. slice, that is larger than all neighbor points in the same spectrogram column. For example, a peak associated with a frequency or a frequency bin is larger than the vertical neighbors of the peak that are associated with different frequencies or frequency bins and that are in the same slice represented by a predetermined window. In some implementations, the window is larger for higher frequencies than lower frequencies, providing a higher density of peaks in lower frequencies.

In certain implementations, the peak repetition detector 112 compares each point in the spectrogram with the neighbors of the point that belong in the same column of the spectrogram. For example, the peak repetition detector 112 compares a particular point associated with a high frequency with ten neighbor values, e.g., five neighbors above and five neighbors below the particular point, to determine whether the particular point is a peak, i.e., if the amplitude of the particular point is greater than the ten neighbor values. When the peak repetition detector 112 identifies peaks for low frequency points, the peak repetition detector 112 may compare a particular low frequency amplitude value with the amplitude values of four neighbor points, e.g., two neighbors above and two neighbors below, to determine whether the particular point is a peak, i.e., if the amplitude of the particular point is greater than the amplitudes of the four neighbor points.

In some implementations, when the peak repetition detector 112 determines whether a particular point near the edge of the spectrogram is a peak, the peak repetition detector 112 compares the amplitude of the particular point with less than a predetermine quantity of neighbor amplitude values. For example, when the particular point is a high frequency point on the edge of the spectrogram, the peak repetition detector 112 compares the amplitude of the particular point with the amplitudes of the next five lower frequency points and does not compare the amplitude of the particular point with the amplitudes of the next five higher frequency points. Further, if the particular point is associated with a high frequency and is separated from the edge of the spectrogram by one other point, the amplitude of the particular point is compared with six other amplitudes to determine whether the particular point is a peak, e.g., the amplitude of the other point and the amplitudes of the next five lower frequency points.

The peak repetition detector 112 generates a sparse representation of the spectrogram (510). For example, based on identifying the peaks of each spectral slice of the spectrogram, the peak repetition detector 112 adjusts the values associated with each of the peaks. In some implementations, the peak repetition detector 112 adjusts the amplitude values associated with each of the peaks to a value of one. In some implementations, the peak repetition detector 112 adjusts the values of the other points in the spectrogram, e.g., the non-peak amplitudes of the spectral slices, to a value of zero.

In certain implementations, the peak repetition detector 112 generates a binary image of the spectrogram where the peaks are represented by values of one and the non-peaks are represented by values of zero by comparing each point in the spectrogram with the neighbors of the point that belong in the same column of the spectrogram.

The peak repetition detector 112 filters one or more frequency bands of the spectrogram (512). For example, the peak repetition detector 112 can filter, e.g., remove, frequency bands from the sparse representation of the spectrogram that are associated with poor audio quality.

In some implementations, the mobile computing device 102 may be only able to effectively capture environmental audio data above a certain frequency, e.g., based on physical limitations of a microphone associated with the mobile computing device 102. Therefore, in these implementations, the peak repetition detector 112 may filter spectrogram rows that correspond to frequency bands below 150 Hz. The peak repetition detector 112 may filter additional or alternative frequency bands from the spectrogram. For example, the peak repetition detector 112 may filter frequency bands above 4300 Hz. The filtering may be performed based on the performance of the microphone associated with the mobile computing device 102 and/or the requirements of the peak repetition detector 112, to name a few examples.

Figure 6:
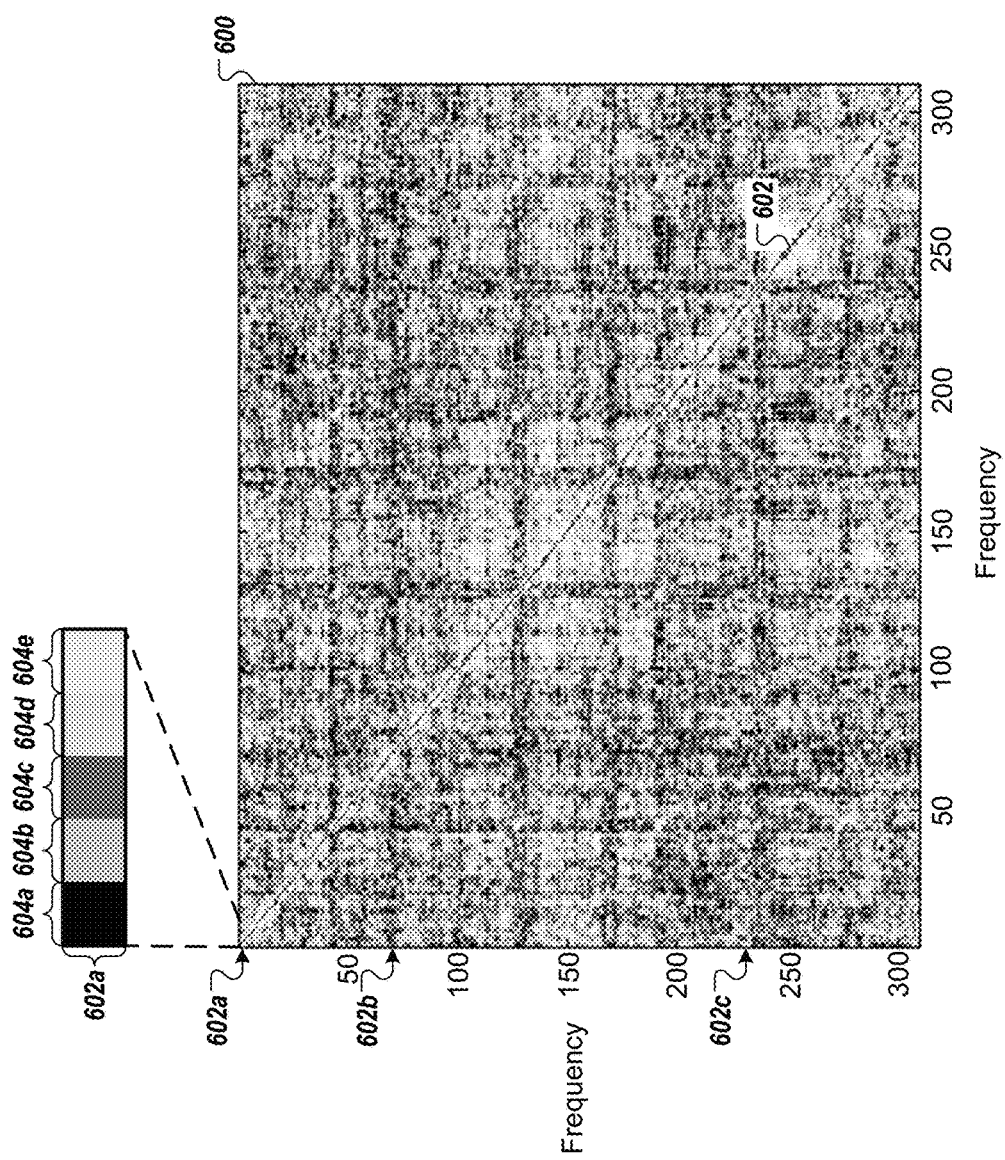
FIG. 6 is an example heatmap.

The peak repetition detector 112 determines a similarity between the slices of the sparse representation of the spectrogram (514). For example, the peak repetition detector 112 may generate a heatmap 600, shown in FIG. 6, of the sparse spectrogram that represents the similarity between the slices of the sparse spectrogram. Specifically, the peak repetition detector 112 generates the heatmap 600 by comparing each column, i.e., spectral slice, in the sparse spectrogram to the other columns, i.e., spectral slices, in the sparse spectrogram, e.g., autocorrelation, where the axes in the heatmap represent the column or row numbers of the sparse spectrogram, e.g., frequency or frequency bin values, and the values represented by the particular points 604a-e in the heatmap represent the similarity between the two columns associated with the particular point. For instance, a first row 602a in the heatmap 600 includes the points 604a-e. Each of the points 604a-e represents a similarity between a frequency bin of zero and each of the other frequency bins. The first point 604a indicates the similarity between the frequency bin of zero and itself. The second point 604b indicates the similarity between the frequency bin of zero and the adjacent frequency bin, e.g., of one. The third point 604c indicates the similarity between the frequency bin of zero and the subsequent frequency bin, e.g., of two. Similarly, other rows 602b-c in the heatmap 600 include points that each represent difference values between a particular frequency bin and all of the frequency bins.

For example, a center diagonal 602 of the heatmap 600, e.g., that includes the first point 604a, represents the similarity between each column, eg., frequency bin, and itself. In this example, when the similarity is represented by the difference between two columns, each of the points 604a along the center diagonal 602 has a maximum similarity value, e.g., has a value of 0 based on a difference between the column and itself being zero. In the example shown, the first value 604a is represented by an RGB color of red:0, green:0, blue: 0, which appears as black, because the difference between a column and itself is zero.

Further, all of the values along the other diagonals of the heatmap represent the same time shift, i.e., the same time difference between two time slices in the sparse spectrogram. For example, each slice of the sparse spectrogram represents the frequency and amplitude of the audio sample at a particular point in time. The values in the center diagonal 602 of the heatmap 600 represent the similarity between each slice and itself, where the time shift is zero, i.e., there is no time difference between a slice and itself. The values in the diagonal above the center diagonal, e.g., that include the point 604b, represent a time shift of one unit of time, e.g., one window, as this diagonal contains the similarity values for each pair of adjacent columns, and so on for the other diagonals in the heatmap 600.

In certain implementations, the peak repetition detector 112 compares the sparse spectrogram to itself utilizing sample correlations of the sparse spectral slices as a similarity function. The peak repetition detector 112 may use any appropriate algorithm to determine the correlation or the similarity between the slices in the spectrogram.

Returning to FIG. 5, for each time shift in the heatmap, the peak repetition detector 112 determines a mean similarity value (516). For example, the mean similarity value for a specific time shift is based on all of the similarity values associated with the specific time shift.

The peak repetition detector 112 generates a projection from the mean similarity values (518). For example, the peak repetition detector 112 averages the similarity values in each of the diagonals of the heatmap, where a greater mean value represents a greater similarity between the corresponding spectral slices of the spectrogram at a corresponding time shift than a smaller mean value.

Figure 7:
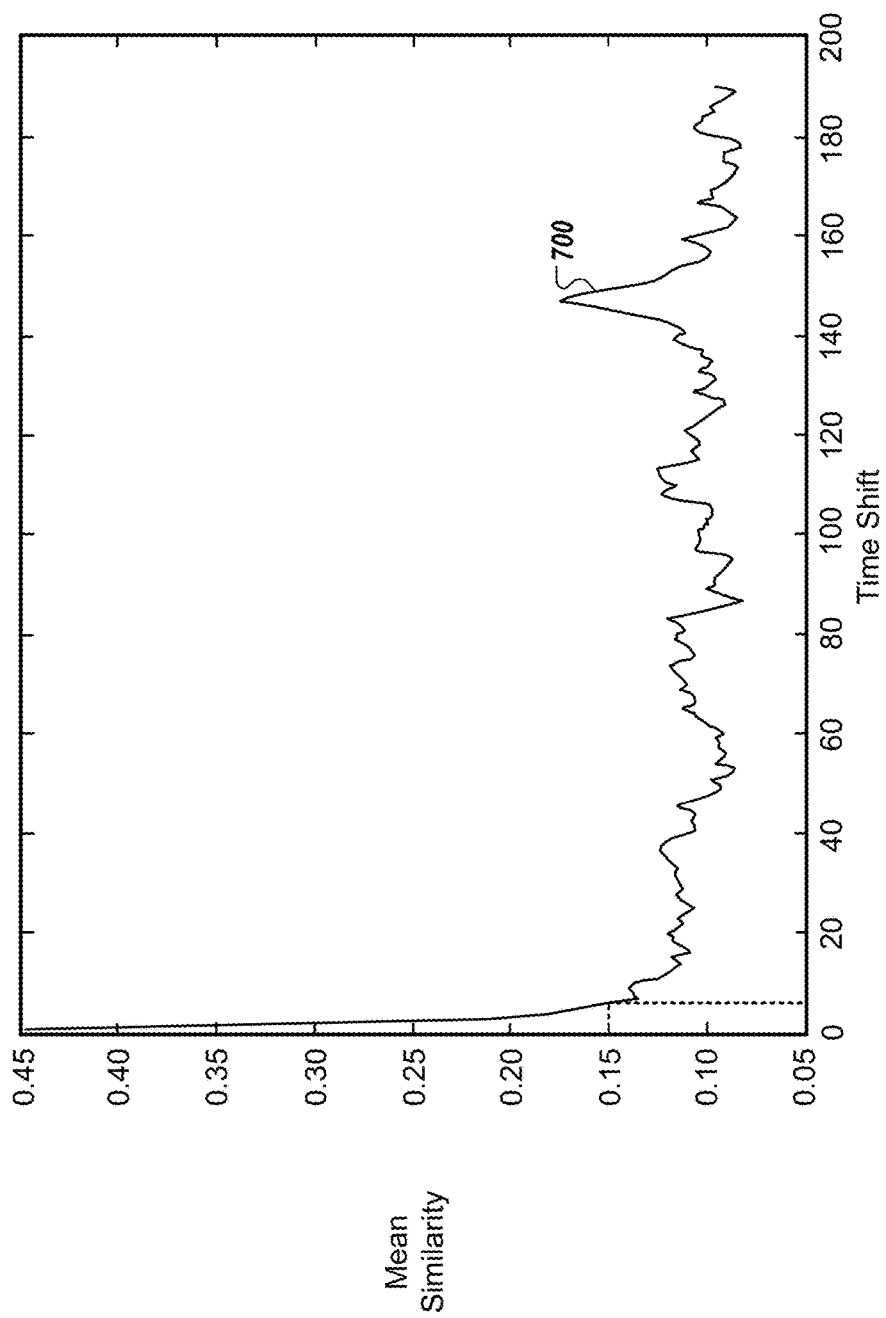

For example, the peak repetition detector 112 may generate a heatmap projection 700, shown in FIG. 7, from the mean similarity values for each of the time shifts. Here, the x axis represents the different time shifts and the y axis represents the average of the similarity values that correspond to a specific time shift, i.e., the mean similarity value. For example, the peak repetition detector 112 identifies all of the heatmap values that correspond to a time shift of five and uses the average of these heatmap values for the mean similarity of a time shift of five in the heatmap projection 700. In the heatmap projection 700 the mean similarity for a time shift of five is about 0.15.

Figure 8:
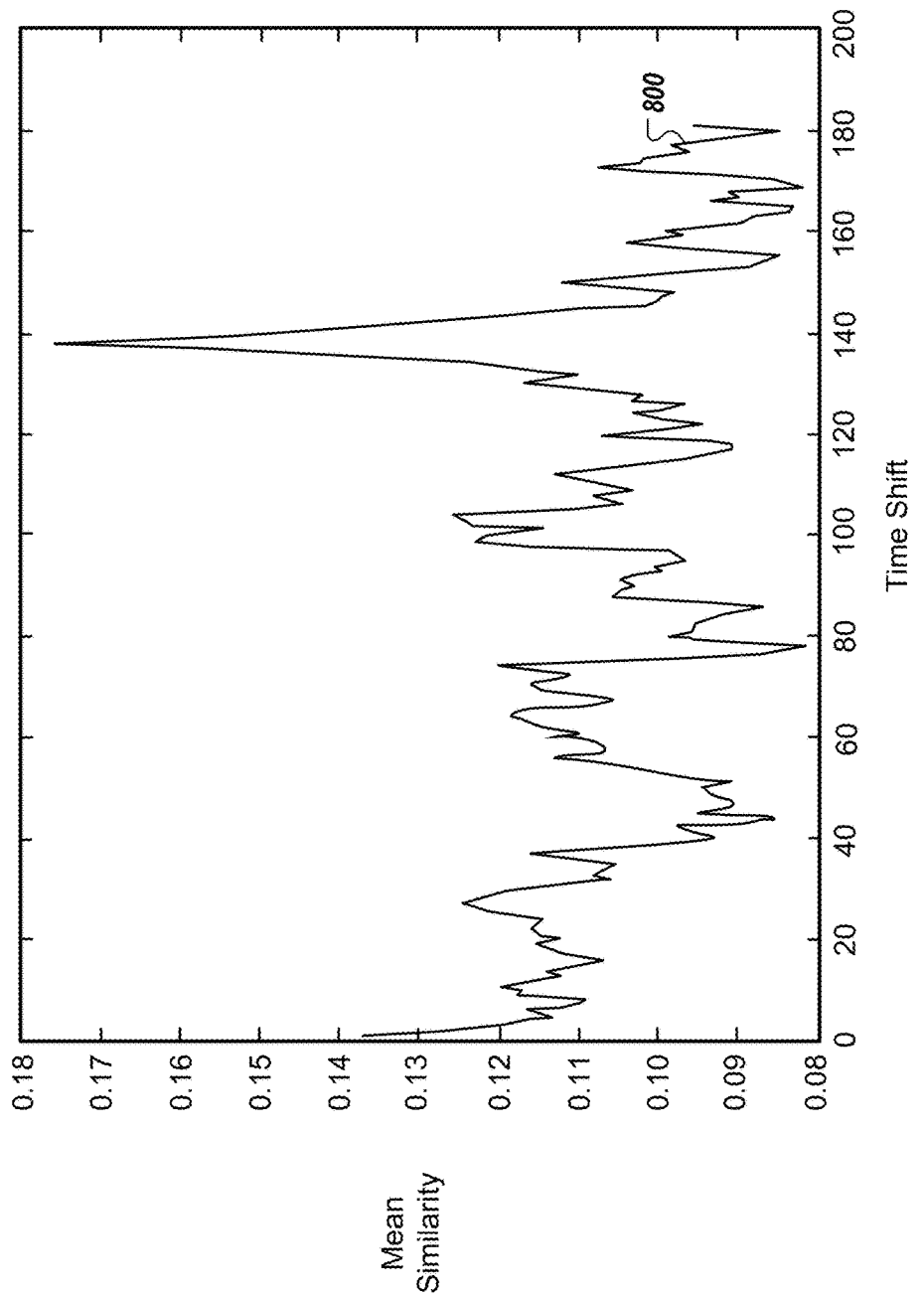

Returning to FIG. 5, the peak repetition detector 112 filters mean similarity values associated with one or more time shifts from the projection (520). In some examples, the peak repetition detector 112 may remove mean similarity values that are associated with time shifts below a first threshold, above a second threshold, or both, from the heatmap projection 700 to create a filtered heatmap projection. For example, the peak repetition detector 112 removes mean similarity values that correspond to time lags below 200 milliseconds and above 3200 milliseconds from the heatmap projection. Thus, in some examples, the peak repetition detector 112 effectively maintains heatmap projections that correspond to time shifts between 200 milliseconds and 3200 milliseconds inclusive. In some examples, the first and the second thresholds are based on a time length of the received audio sample. One example of a filtered heatmap projection 800 generated by the peak repetition detector 112 is shown in FIG. 8.

Figure 9:
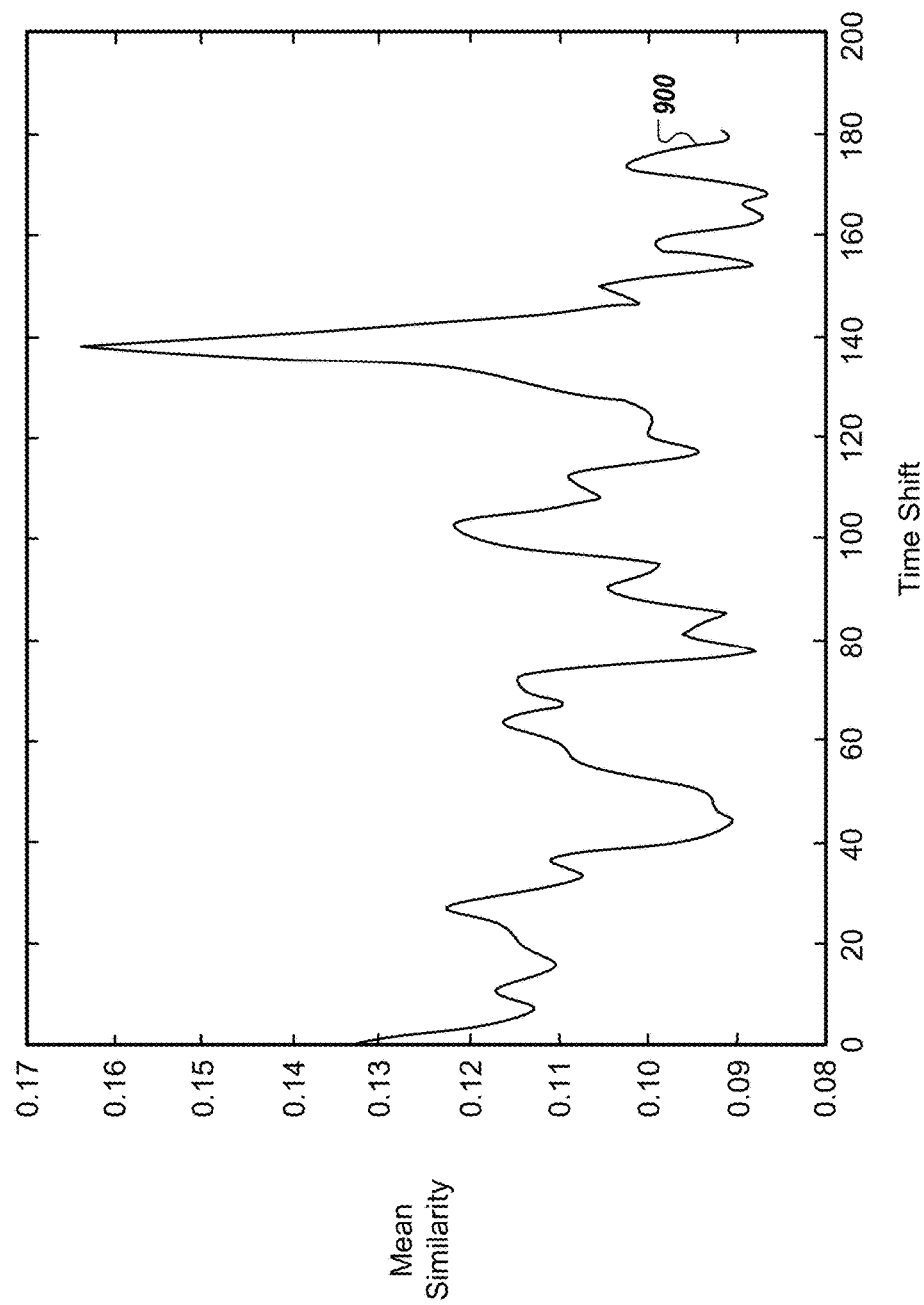

Returning to FIG. 5, the peak repetition detector 112 smooths the filtered projection (522). For example, the peak repetition detector 112 may smooth the filtered heatmap projection with a Gaussian filter mask. The peak repetition detector 112 may use other appropriate algorithms to smooth the filtered heatmap projection 800 and create a smoothed heatmap projection. One example of a smoothed heatmap projection 900 generated by the peak repetition detector 112 is shown in FIG. 9.

Figure 10:
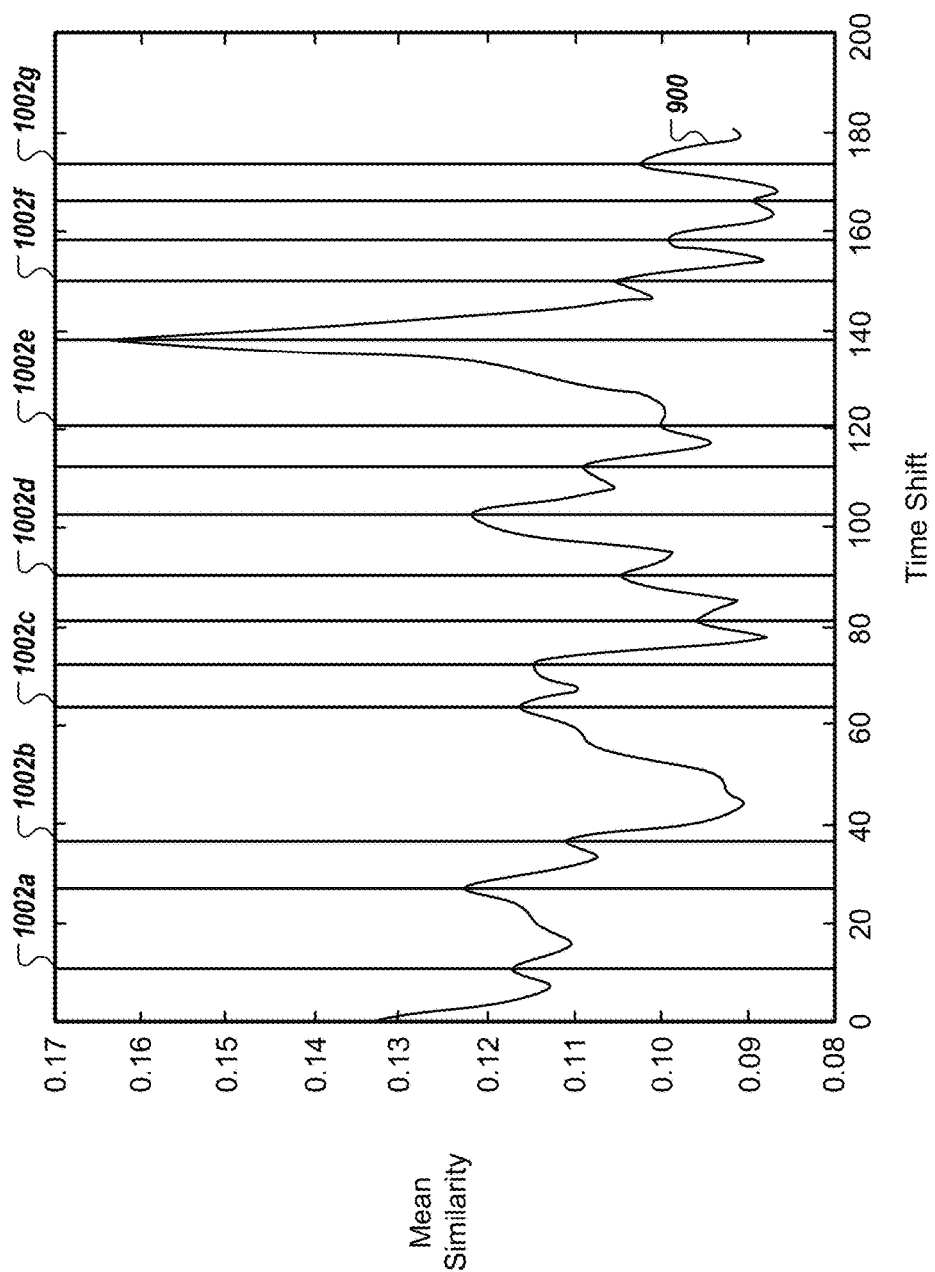

Returning to FIG. 5, the peak repetition detector 112 determines a density of the local peaks in the smoothed projection (524). For example, the peak repetition detector 112 may compute the density of the local peaks in the smoothed heatmap projection 900 based on the number of local peaks 1002a-g, shown in FIG. 10, and the length of the smoothed heatmap projection 900. For example, the density of the local peaks is determined as the number of local peaks in the smoothed heatmap projection 900 divided by the length of the smoothed heatmap projection 900.

Returning to FIG. 5, the peak repetition detector 112 determines a peak repetition score for the audio sample (526). The peak repetition score is a measure of the presence of consistent salient repetitions in the audio sample that are characteristic of music audio data. In some implementations, the peak repetition score is based on a maximum of the filtered heatmap projection, e.g., the maximum value from the filtered heatmap projection, a sample standard deviation of the filtered heatmap projection, i.e., an estimate of the standard deviation of the unfiltered heatmap projection based on the filtered heatmap projection, and the density of the local peaks in the smoothed heatmap projection. For example, the peak repetition score may be determined by the equation (A×B)/C, where A is the maximum of the filtered heatmap projection, B is the sample standard deviation of the filtered heatmap projection, and C is the density of the local peaks in the smoothed heatmap projection. However, in other implementations, the peak repetition score can be based on other equations.

In some implementations, the peak repetition detector 112 is more robust to noise, e.g., non-music audio data, and small inessential changes in music audio data as a result of utilizing the sparse spectrogram. For example, FIGS. 11A-B depict a non-music heatmap projection 1100a and a music heatmap projection 1100b of mean similarity values for non-music audio data and music audio data respectively. Here the mean similarity values associated with the music heatmap projection 1100b are more similar than the mean similarity values associated with the non-music heatmap projection 1100a that includes both positive and negative mean similarity values.

The order of steps in the process 500 described above is illustrative only, and the determination of whether an audio sample contains music by measuring harmonic repetitions can be performed in different orders. For example, the peak repetition detector 112 may filter time shifts that are below or above a predetermined threshold, e.g., perform step 520, from the heatmap prior to determining the mean similarity values, e.g., perform step 516.

In some implementations, the process 500 can include additional steps, fewer steps, or some of the steps can be divided into multiple steps. For example, when a music detector engine 104 performs the process 500 in conjunction with the process 200 on the same audio sample, the music detector engine 104 may perform either the steps 202 and 210 through 212 or the steps 502 through 506, i.e., the music detector only needs to receive an audio sample, compute a spectrogram, and correct for spectral tilt once.

In some implementations, the process 500 includes steps 204 through 208. For example, the process 500 can determine whether a received audio sample has a low intensity and does not need further processing based on an average squared magnitude of the audio sample.

In some implementations, the steps 508 and 510 are performed together. For example, as the peak repetition detector 112 identifies a peak, the peak repetition detector 112 adjusts the amplitude of the peak to a predetermined value, e.g., one. Once the peak repetition detector 112 has identified all of the peaks in the spectrogram and adjusted the amplitude of all of the peaks, the peak repetition detector 112 adjusts all of the other amplitudes in the spectrogram to different predetermined value, e.g., zero. Alternatively, when the peak repetition detector 112 identifies a peak, the peak repetition detector 112 adjusts the amplitude of the peak to a first predetermined value and the amplitudes of the neighboring points to a second predetermined value.

In some implementations, the peak repetition detector 112 generates a triangular heatmap, e.g., the upper right half of the heatmap 600. For example, the peak repetition detector 112 only generates the similarity values for the slices in the spectrogram once, i.e., in step 514, and uses these similarity values to generate the mean similarity values for each of the time shift values, i.e., in step 516. In some implementations, the peak repetition detector 112 might not compare each slice to itself and generate the center diagonal 602.

In some implementations, the peak repetition detector 112 averages the similarity values for time shifts that are greater than a minimum threshold value and/or less than a maximum threshold value and does not discard mean similarity values associated with one or more time shifts. For example, as part of step 516, the peak repetition detector 112 determines mean similarity values for a subset of the time shifts represented in the heatmap and does not perform step 520.

For example, the peak repetition detector may discard, e.g., not compute a mean value for, all the similarity values for a particular time shift, e.g., diagonal in the heatmap 600, when audio repetitions for the particular time shift, represented by higher similarity values associated with the particular time shift, typically do not correlate with the audio sample containing music audio data. For example, the peak repetition detector 112 may discard or otherwise ignore similarity values associated with short time shifts and/or long time shifts. In these implementations, the threshold value may be based on a time length of the received audio sample.

Figure 12:
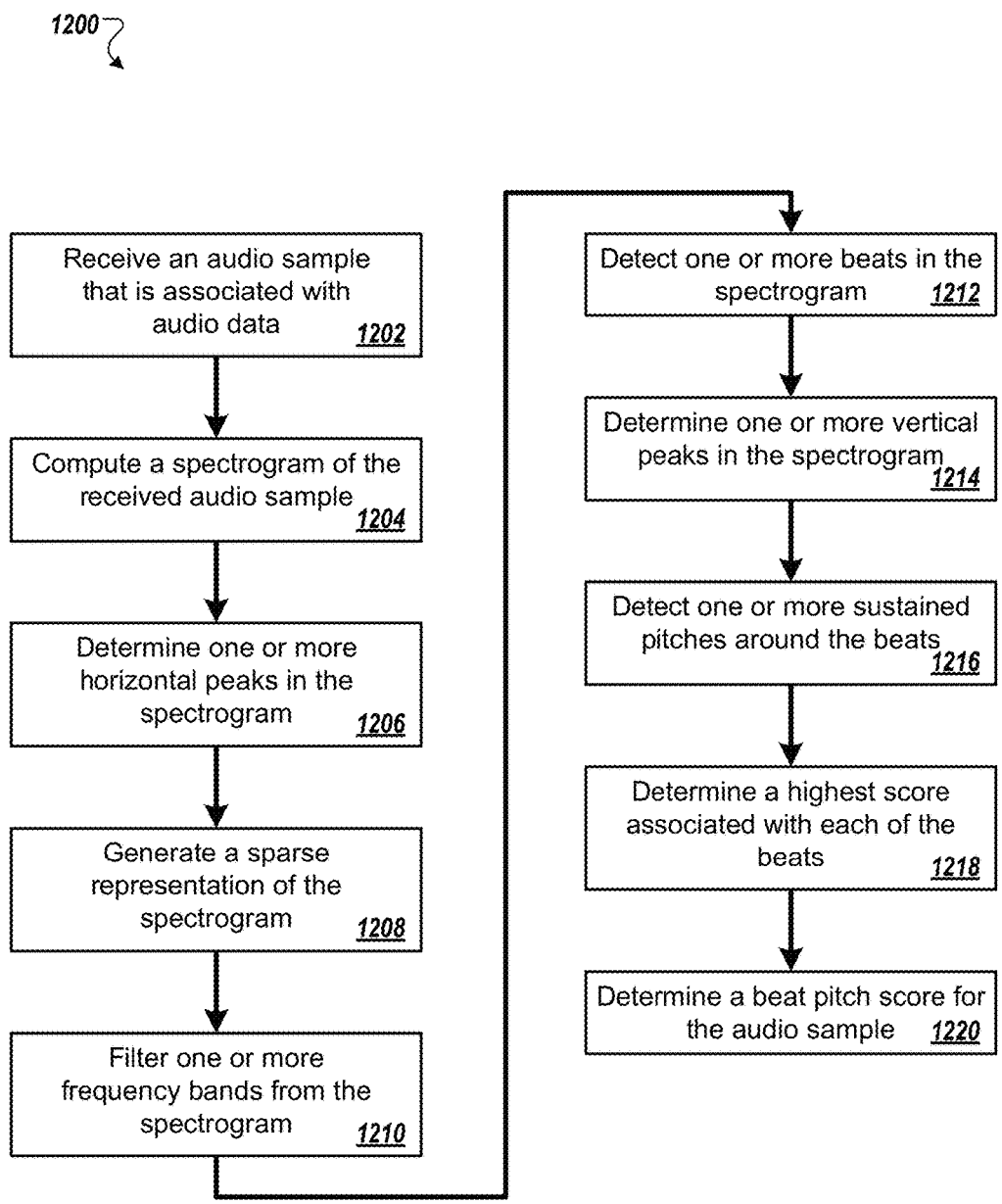

FIG. 12 is a flow diagram of a process 1200 for determining whether an audio sample contains music audio data by finding beats in the audio sample and sustained pitches around each beat. The process 1200 can be used by the beat pitch detector 114 from the system 100. For example, the beat pitch detector 114 receives an audio sample, e.g., of the environmental audio data, and detects beats and sustained pitches around each beat in the audio sample, where sustained pitches around the beats are more likely to occur in music audio data as compared to an audio sample that does not include music audio data.

The beat pitch detector 114 receives an audio sample that is associated with audio data (1202). For example, the beat pitch detector 114 receives t seconds of the audio data as the audio sample. In some examples, the audio sample has a length of between about 0.5 seconds to about 10 seconds. For example, the audio sample may have a length of about 1.1 seconds or about 2.5 seconds.

In some implementations, the beat pitch detector 114 receives two or more audio samples with a sliding time window. For example, the beat pitch detector 114 continuously receives audio samples having overlapping time periods. For example, the sliding window can be 2.5 seconds.

Figure 13:
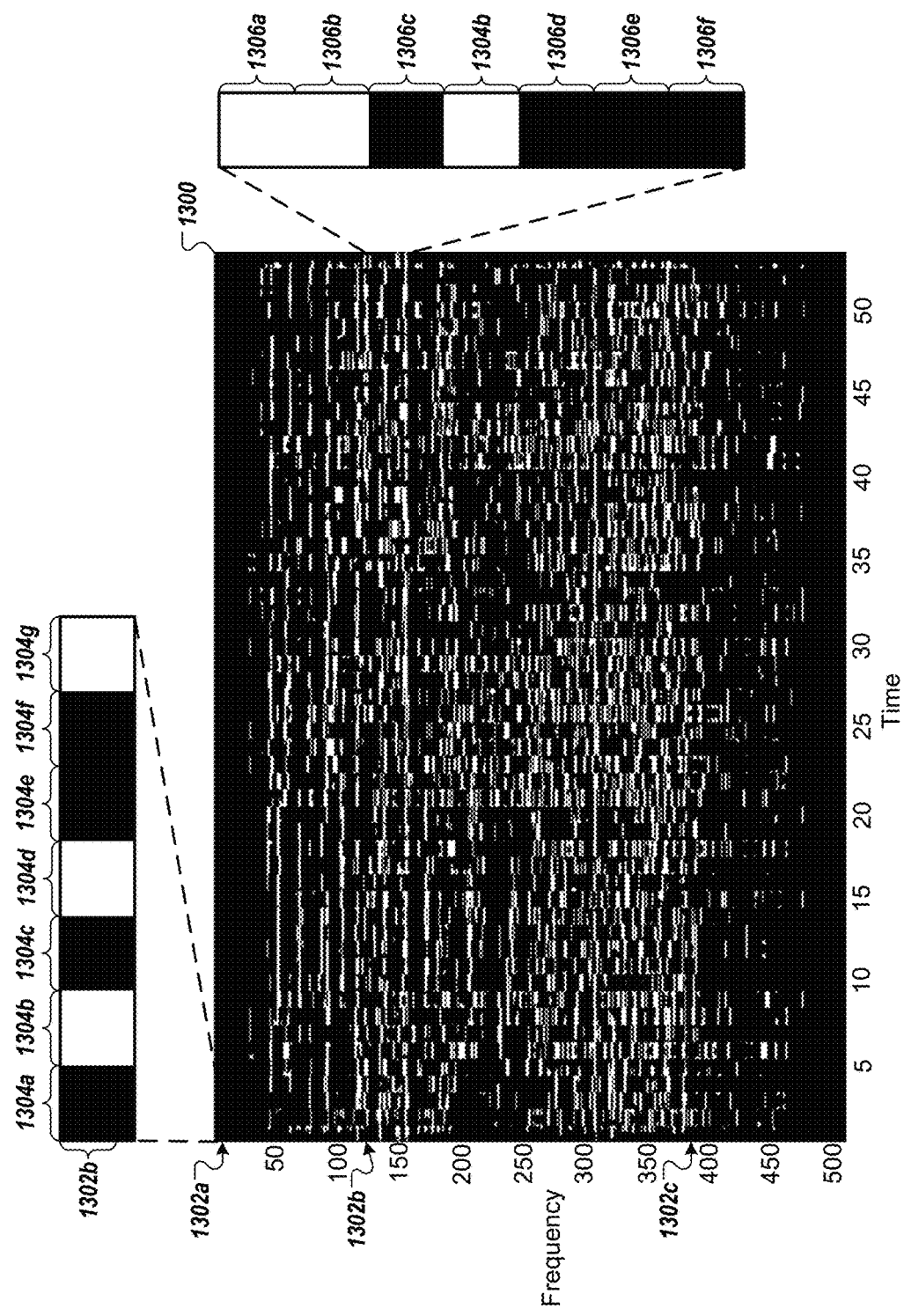

The beat pitch detector 114 computes a spectrogram of the received audio sample (1204). For example, the beat pitch detector 114 computes a time-varying spectral representation of the received audio sample, such as a spectrogram 1300 shown in FIG. 13.

In some examples, the beat pitch detector 114 computes the spectrogram of the received audio sample utilizing a fast Fourier transform (FFT). In some examples, an associated window length of the spectrogram is 128 milliseconds. In some implementations, the windows from the received audio sample do not overlap.

In some implementations, the beat pitch detector 114 computes a chromogram. In some examples, the beat pitch detector 114 utilizes autocorrelation in processing the received audio sample.

Returning to FIG. 12, the beat pitch detector 114 determines one or more horizontal peaks in the spectrogram (1206). For example, the beat pitch detector 114 determines the horizontal peaks in the spectrogram by comparing each point in the spectrogram with the point's neighbors to the left and to the right of the point.

In some implementations, the beat pitch detector 114 compares each point 1304a-g in the spectrogram 1300 with the point's neighbors that are associated with the same frequency or frequency bin 1302a-c. For example, the beat pitch detector 114 compares a first point 1304c with the two points 1304a-b to the left of the first point and the two points 1304d-e to the right of the first point where all of the points are associated with the same frequency bin 1302b but represent different instances in time to determine whether the first point is a peak.

Figure 14:
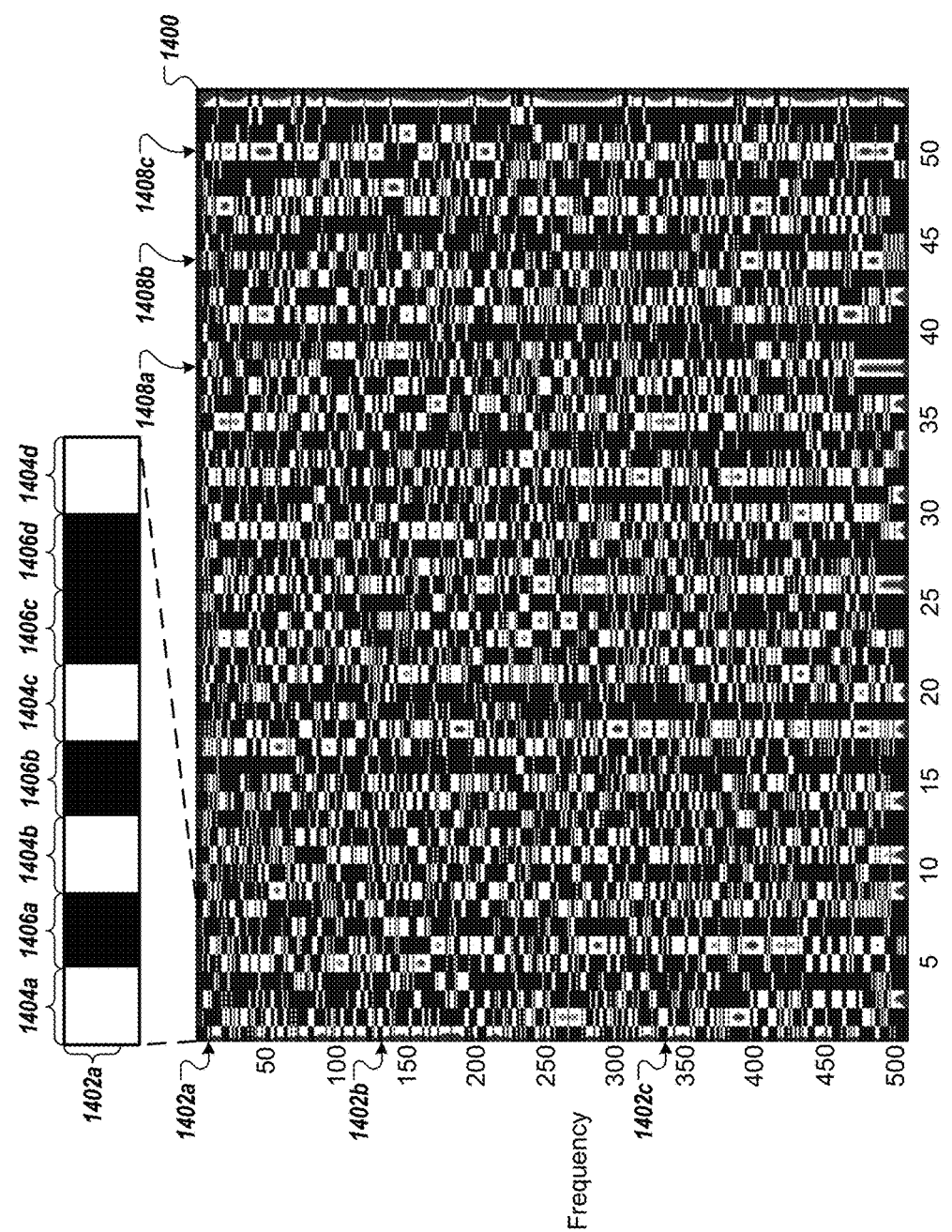

The beat pitch detector 114 generates a sparse representation of the spectrogram (1208). For example, based on identifying the horizontal peaks in the spectrogram, the beat pitch detector 114 adjusts the values of each of the peaks. In some implementations, the beat pitch detector 114 adjusts the amplitude values associated with each of the peaks to a value of one. In some implementations, the beat pitch detector 114 adjusts the values of the other points of the spectrogram, e.g., the non-peak amplitudes, to a value of zero. For example, the beat pitch detector 114 generates a horizontal peak spectrogram 1400, shown in FIG. 14, where the horizontal peaks 1404a-d are represented by values of one, e.g., white, and the non-peaks 1406a-d are represented by values of zero, e.g., black.

In some implementations, the horizontal peak spectrogram 1400 represents a binary spectrogram of a music audio sample. For example, a horizontal peak spectrogram associated with non-music audio data may include a more uniform distribution of horizontal peaks 1404a-d than a horizontal peak spectrogram associated with music audio data.

Returning to FIG. 12, the beat pitch detector 114 filters one or more frequency bands of the spectrogram (1210). For example, the beat pitch detector 114 may filter one or more frequencies of the horizontal peak spectrogram 1400. In some implementations, the beat pitch detector 114 removes frequencies below 150 Hz and frequencies above 4000 Hz from the spectrogram. In certain implementations, the beat pitch detector 114 removes frequencies between about 850 Hz and about 2650 Hz from the spectrogram. For example, the beat pitch detector 114 creates an updated spectrogram with frequency ranges between about 150 Hz to about 850 Hz and between about 2650 Hz to about 4000 Hz.

Figure 15:
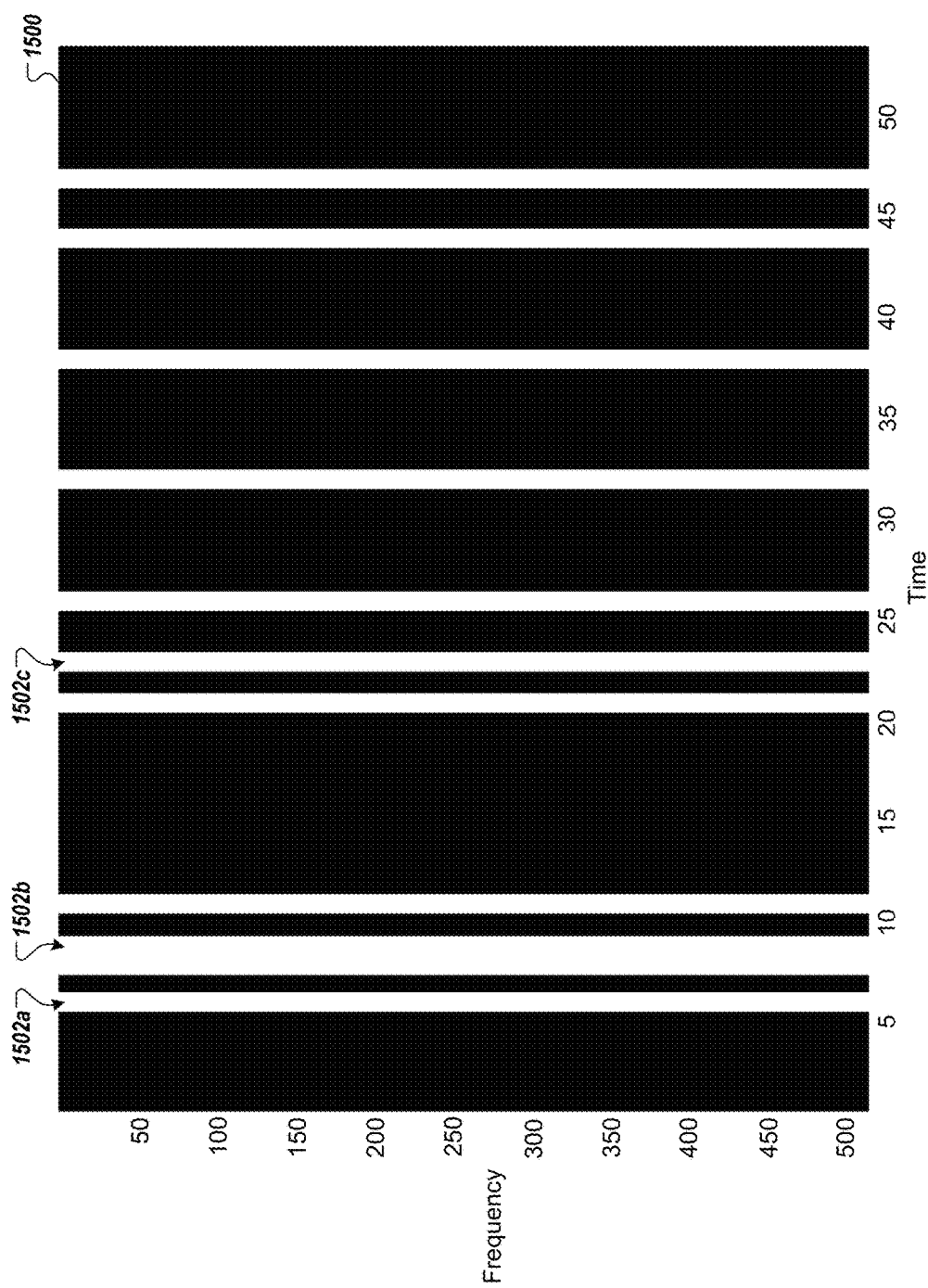

The beat pitch detector 114 detects one or more beats in the spectrogram (1212). For example, for each time slice 1408a-c in the horizontal peak spectrogram 1400, the beat pitch detector 114 determines the number of horizontal peaks 1404a-d in the time slice 1408a-c. If at least a predetermined percentage of the frequency bins 1402a-c for the time slice 1408a-c include horizontal peaks 1404a-d, then the beat pitch detector 114 classifies the time slice 1408a-c as including a beat. For example, the beat pitch detector generates a beat spectrogram 1500, shown in FIG. 15 based on the beats 1502a-c detected in the horizontal peak spectrogram 1400.

In some implementations, the predetermined percentage is based on the type of music included in the audio sample. In certain implementations, the predetermined percentage is based on the types of instruments that generated the audio sample. In some examples, the predetermined percentage is 33%. For example, when the beat pitch detector 114 determines that at least ⅓ of the frequency bins for a particular time slice include horizontal peaks, then the beat pitch detector 114 classifies that particular time slice as including a beat. In other examples, the predetermined percentage is 50%.

Returning to FIG. 12, the beat pitch detector 114 determines one or more vertical peaks in the spectrogram (1214). For example, the beat pitch detector 114 determines the vertical peaks in the in the spectrogram 1300, shown in FIG. 13, by comparing each point 1304a-g in the spectrogram with the point's neighbors 1306a-f above and below the point.

In some implementations, the beat pitch detector 114 compares each point 1304a-g in the spectrogram 1300 with the point's neighbors 1306a-f that are associated with the same time slice. For example, the beat pitch detector 114 compares a first point 1304b with the five points above the first point, e.g., the points 1306a-c and two additional points, and the five points below the first point, e.g., the points 1306d-f and two additional points, where all of the points 1304b and 1306a-f are associated with the same time slice to determine whether the first point 1304b is a vertical peak.

Figure 16:
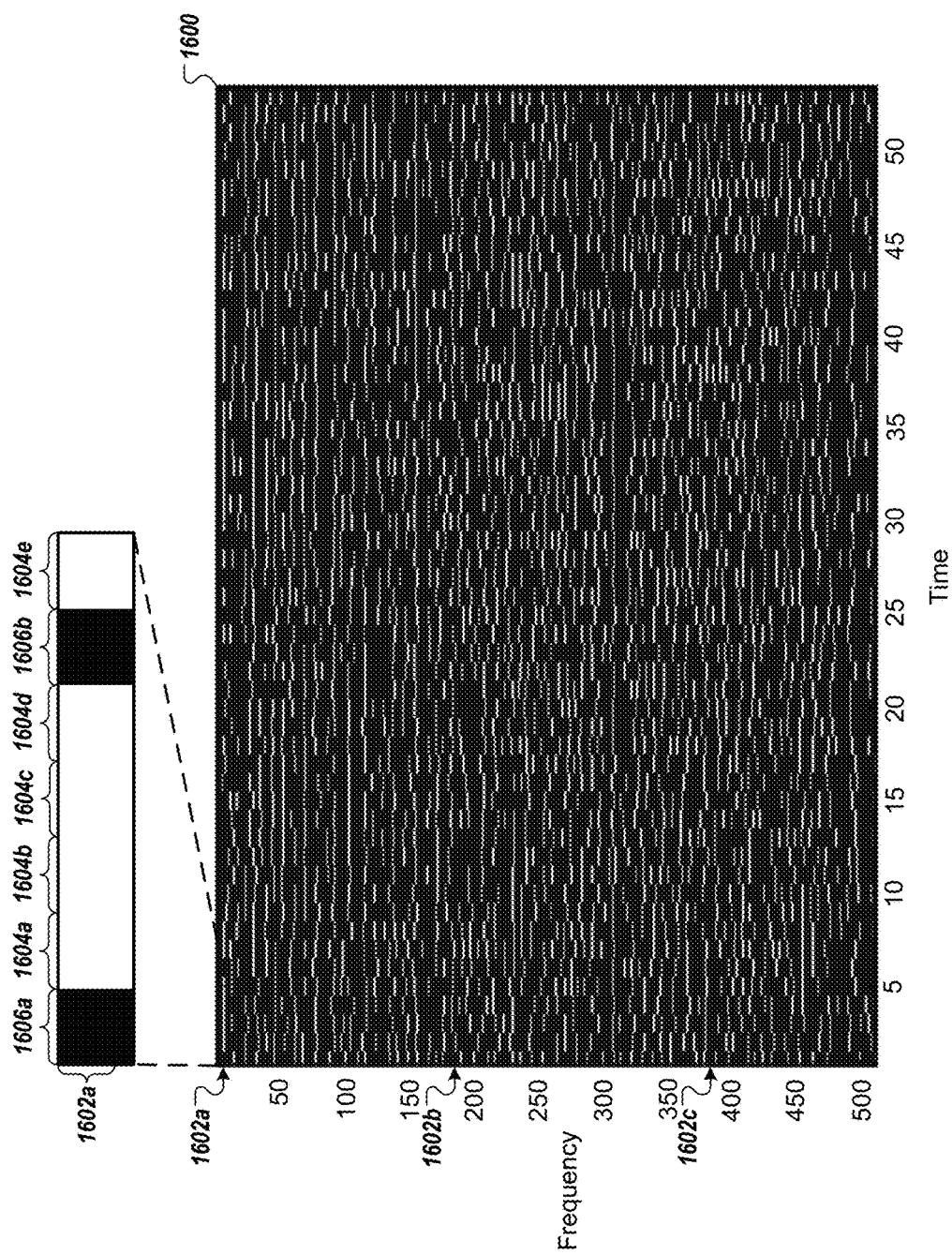

In some implementations, the beat pitch detector 114 generates a vertical peak spectrogram 1600, shown in FIG. 16, from the spectrogram 1300 based on the determined vertical peaks. In some implementations, the vertical peak spectrogram 1600 represents the vertical peaks 1604a-e with a value of one, e.g., white, and the non-peaks 1606a-b with a value of zero, e.g., black.

Returning to FIG. 12, the beat pitch detector 114 detects one or more sustained pitches around the beats (1216). For example, the beat pitch detector 114 uses the vertical peaks 1604a-e in the vertical peak spectrogram 1600 to determine the sustained pitches around the beats 1502a-c in the beat spectrogram 1500.

Figure 17A:
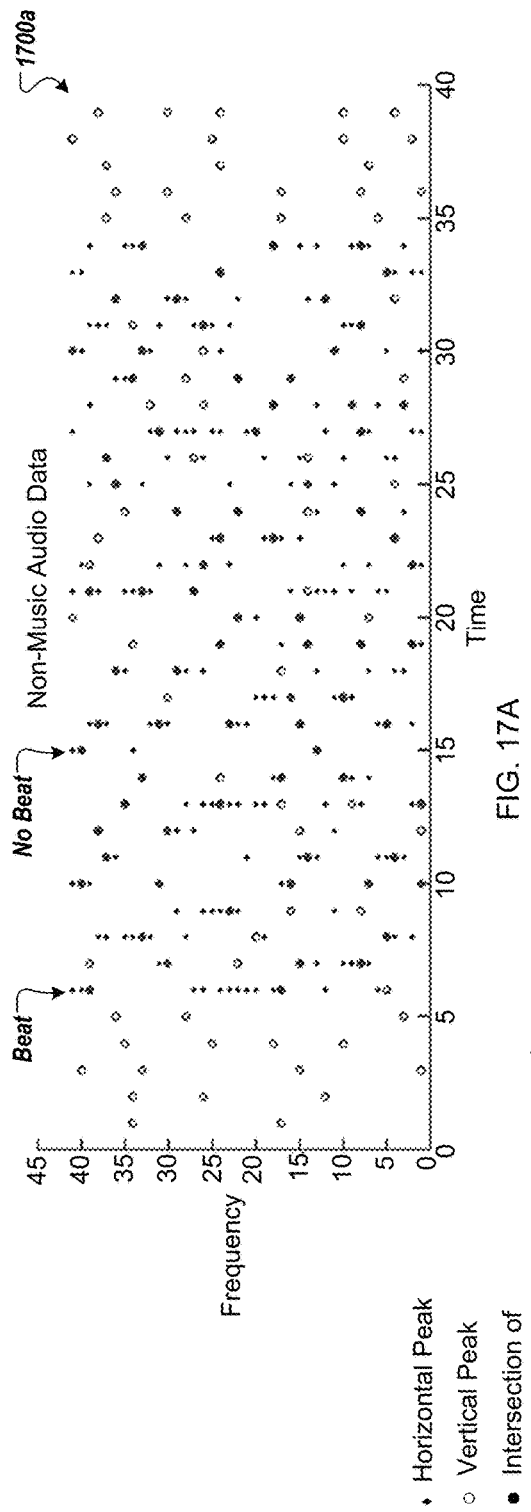
FIGS. 17A-B are example beat pitch graphs.
Figure 17B:
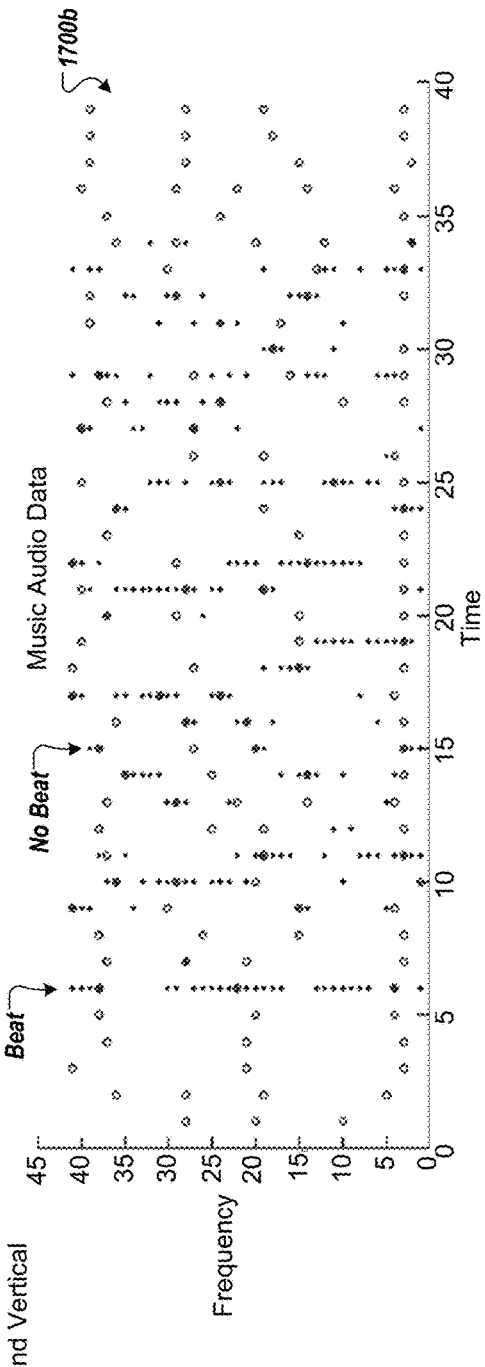

For example, a beat pitch graph 1700a-b, shown in FIGS. 17A-B, represents a combination of the horizontal peak spectrogram 1400 and the vertical peak spectrogram 1600 and depicts the horizontal peaks 1404a-h, selected in time, and the vertical peaks 1604a-e, selected in frequency, of the received audio sample. Here, the vertical columns in the beat pitch graphs 1700a-b with a higher density of horizontal peaks correspond to the beats 1502a-c presented in the beat spectrogram 1500.

For each specific time slice in the received audio sample that contains a beat, the beat pitch detector 114 finds the vertical peaks that are in the neighboring time slices and the specific time slice. For example, the beat pitch detector 114 determines a quantity of vertical peaks in the neighboring time slices and the specific time slice.

In some implementations, when determining the quantity of vertical peaks in the neighboring time slices and the specific time slice, the beat pitch detector 114 analyzes each of the frequency bins for the specific time slice separately. For example, the beat pitch detector 114 forms an 11×1 window around a frequency bin where the window is centered on the specific time slice that contains a beat. The beat pitch detector 114 then determines a score representing the quantity of vertical peaks in the window. For example, the beat pitch detector 114 may count the total number of vertical peaks in the window for a maximum score of eleven, i.e., based on the size of the window, such as the width, for each of the frequency bins associated with the specific time slice.

For example, the beat pitch detector 114 may determine, for each of the beats, one or more windows associated with the beat, each window centered on the beat, associated with a row in the spectrogram, and with the same predetermined width, e.g., eleven. The beat pitch detector 114 may determine, for each of the windows, a quantity of vertical peaks in the window.

Returning to FIG. 12, the beat pitch detector 114 determines a highest score associated with each of the time slices that contain a beat (1218). For example, the beat pitch detector 114 compares the scores associated with each of the frequency bins for the specific time slice and selects the highest score as the score for the specific time slice.

For example, the beat pitch detector 114 may determine, for each of the beats, a highest score associated with the beat, the highest score based on the highest quantity of vertical peaks in one of the windows associated with the beat, such that a score for each of the beats comprises the highest score for the beat.

The beat pitch detector 114 determines a beat pitch score for the audio sample (1220). For example, the beat pitch detector 114 combines the scores for each of the time slices that contain a beat to determine the beat pitch score. In one example, the beat pitch detector 114 sums the scores, i.e., the highest scores, associated with each of the time slices that contain a beat to determine the beat pitch score.

Specifically, the beat pitch score is a measure of sustained pitches around the beats in the received audio sample. In some implementations, a higher beat pitch score for an audio sample indicates a higher likelihood that the audio sample contains music audio data than if the audio sample was associated with a lower beat pitch score. For example, the music audio data beat pitch graph 1700*b* would be associated with a higher beat pitch score than the non-music audio data beat pitch graph 1700*a* based on a higher occurrence of vertical peaks in horizontal lines around the horizontal peaks in the music audio data beat pitch graph 1700*b*.

The order of the steps in the process 1200 described above is illustrative only, and the finding of sustained pitches around each beat can be performed in different orders. For example, the beat pitch detector 114 may determine the vertical peaks, e.g., perform step 1214, prior to determining the horizontal peaks, e.g., perform step 1206.

In some implementations, the process 1200 can include additional steps, fewer steps, or some of the steps can be divided into multiple steps. For example, when a music detector performs the process 1200 in conjunction with the process 200 or the process 500 on the same audio sample, the music detector may receive the audio sample, and compute a spectrogram once.

Further, the process 1200 may include additional steps described above with reference to the process 200 or the process 500. For example, the beat pitch detector 114 may correct the spectrogram 1300 for spectral tilt.

In some implementations, the process 1200 does not generate the horizontal peak spectrogram 1400 and/or filter one or more frequency bands of the spectrogram. For example, the beat pitch detector 114 may determine the horizontal peaks without generating the horizontal peak spectrogram 1400.

In some implementations, step 1216 is divided into multiple steps. For example, the beat pitch detector 114 may find the vertical peaks around each beat, determine, for each beat, the number of vertical peaks in each frequency bin around the specific beat, select the highest score associated with one of the frequency bins for the specific beat, and combine the highest scores for all of the beats included in the received audio sample to determine a beat pitch score for the received audio sample.

In some implementations, the linear classifier 116 uses input from a frame entropy engine when determining whether an audio sample contains music audio data or non-music audio data. For example, the frame entropy engine is one of the additional detectors 120 and detects music audio data in an audio sample by measuring the median Shannon entropy of a spectral slice.

In certain implementations, the frame entropy engine measures the Shannon entropy of a spectral slice by performing the following steps. For example, the frame entropy engine receives an audio sample and computes a spectrogram of the audio sample. The audio sample may be between about 0.5 seconds and about 5.0 seconds long. In some implementations, the frame entropy engine uses a fast Fourier transform to compute the spectrogram. The frame entropy engine may use a window length of 128 milliseconds when computing the spectrogram. The windows used to compute the spectrogram may overlap. For example, the frame entropy engine may use windows with a ¾ overlap.

The frame entropy engine may correct the spectrogram for spectral tilt. The frame entropy engine may correct the spectrogram for overweight lower frequencies. For example, the frame entropy engine may multiple each row or frequency bin in the spectrogram with the square root of the zero-based row index, e.g., the square root of the frequency value, as described above with reference to FIG. 2.

The frame entropy engine may filter low frequencies and high frequencies from the spectrogram. For example, the frame entropy engine may remove the frequencies, or frequency bins associated with frequencies, lower than 170 Hz and higher than 2200 Hz from the spectrogram, creating a filtered spectrogram associated with frequencies between 170 Hz to 2200 Hz, inclusive.

For each spectral slice in the spectrogram, the frame entropy engine may compute the Shannon entropy of the linear magnitude of the spectral slice. The frame entropy engine may use any appropriate algorithm to determine the Shannon entropy of a spectral slice.

The frame entropy engine computes a frame entropy score for the audio sample based on the Shannon entropy values associated with the spectral slices in the audio sample. For example, the frame entropy score is the negative of the median Shannon entropy value associated with the spectral slices for the audio sample.

The frame entropy score is a representation of whether the audio sample contains music or non-music audio data. For example, music tends to have a lower spectral slice Shannon entropy than non-music, and higher frame entropy scores may be associated with music audio data compared to non-music audio data when the frame entropy scores are the negative of the median Shannon entropy value associated with the spectral slices for an audio sample.

The frame entropy engine may use any other appropriate algorithm to determine the entropy of each of the spectral slices for an audio sample and generate a frame entropy score based on the entropy values that is representative of whether the audio sample contains music or non-music audio data.

In some implementations, the linear classifier 116 uses input from an energy entropy engine when determining whether an audio sample contains music audio data or non-music audio data. For example, the energy entropy engine is one of the additional detectors 120 and measures the audio energy entropy of the audio sample.

In certain implementations, the energy entropy engine measures the audio energy entropy of an audio sample by performing the following steps. For example, the energy entropy engine receives an audio sample and creates one or more windows associated with the audio sample. The audio sample may be between about 0.5 and about 5.0 seconds long. In some implementations, the energy entropy engine creates non-overlapping windows for the audio sample. In some examples, the windows are about 90 milliseconds long.

The energy entropy engine computes the energy of each window as the sum of the squared signal. For example, the entropy engine computes the sum of each squared value in a window as sum=$s_1^2 + s_2^2 + s_3^2 + \ldots$. In some examples, the energy entropy engine measures the amplitude of the signal in each window. In some examples, the energy entropy engine uses the root mean square (RMS) to measure the amplitude of the signal in each window from the audio sample.

The energy entropy engine combines the computed energies to determine an energy entropy score. For example, the energy entropy engine determines the Shannon entropy of the obtained energies of each of the windows and uses the determined Shannon entropy as the energy entropy score for the received audio sample. The energy entropy score is a representation of whether the audio sample contains music or non-music audio data. The energy entropy engine may use any other appropriate algorithm to determine the energy entropy of an audio sample.

In some implementations, the linear classifier 116 uses input from a spectral centroid engine when determining whether an audio sample contains music audio data or non-music audio data. For example, the spectral centroid engine is one of the additional detectors 120 and computes the midpoint of the spectral energy distribution of a sound in an audio sample, e.g., the balance point of the spectrum in the audio sample.

In certain implementations, the spectral centroid engine computes the midpoint of the spectral energy distribution of a sound in an audio sample by performing the following steps. For example, the spectral centroid engine receives an audio sample and computes a spectrogram of the audio sample. The audio sample may be between about 0.5 and about 5.0 seconds long. In some implementations, the spectral centroid engine uses a fast Fourier transform to compute the spectrogram. The spectral centroid engine may use a window length of 64 milliseconds when computing the spectrogram. The spectral centroid engine may use non-overlapping windows when computing the spectrogram.

The spectral centroid engine may correct the spectrogram for spectral tilt as described with reference to FIG. 2 above.

For each spectral slice in the spectrogram, the spectral centroid engine may compute the spectral centroid for the respective spectral slice. The spectral centroid may be computed as the sum of the frequencies weighted by the linear magnitudes and divided by the sum of the linear magnitudes.

The spectral centroid engine determines a spectral centroid score for the audio sample based on the spectral centroid values. For example, the spectral centroid score may be the median spectral centroid associated with the spectral slices for the audio sample over a time window.

The spectral centroid score is a representation of whether an audio sample contains music or non-music audio data. The spectral centroid engine may use any other appropriate algorithm to determine the spectral centroid of an audio sample.

In some implementations, the linear classifier 116 uses input from a zero crossing rate engine when determining whether an audio sample contains music audio data or non-music audio data. For example, the zero crossing rate engine is one of the additional detectors 120 and may measure the average zero crossing rate of the audio sample.

In certain implementations, the zero crossing rate engine measures the average zero crossing rate of an audio sample by performing the following steps. For example, the zero crossing rate engine receives an audio sample and creates one or more windows associated with the audio sample. The audio sample may be between about 0.5 seconds and about 5.0 seconds long. In some implementations, the windows are about 32 milliseconds long. The zero crossing rate engine may use non-overlapping windows.

For each window, the zero crossing rate engine determines the zero crossing rate. The zero crossing rate may be determined by dividing the quantity of signal zero crossings by the quantity of signal samples. In some examples, the zero crossing rate is a number between 0.0 and 1.0.

The zero crossing rate engine determines a zero crossing rate score. For example, the zero crossing rate score is the median zero crossing rate for the audio sample.

The zero crossing rate score is a representation of whether an audio sample contains music or non-music audio data. The zero crossing rate engine may use any other appropriate algorithm to determine the zero crossing rate of an audio sample.

The linear classifier 116 receives input from one or more detectors and determines whether an audio sample contains music or non-music audio data based on the received input. For example, the linear classifier 116 receives the spectral fluctuation score, the peak repetition score, the beat pitch score, the frame entropy score, the energy entropy score, the spectral centroid score, and the zero crossing rate score and combines the scores to determine whether the audio sample contains music or non-music audio data.

In some implementations, the linear classifier 116 receives input from a subset of the spectral fluctuation detector 110, the peak repetition detector 112, the beat pitch detector 114, and the additional detectors 120, e.g., the frame entropy detector, the energy entropy engine, the spectral centroid engine, and the zero crossing rate engine. In some implementations, the linear classifier 116 receives input from other detectors that generate scores indicative of whether an audio sample contains music or non-music audio data.

The linear classifier 116 may receive input from one or more detectors that indicate the state of the environmental audio data. For example, the linear classifier engine may use the input to determine information about a song recorded in an audio sample. In one example, the linear classifier 116 may determine the name and/or the artist of the song.

In some implementations when determining whether an audio sample contains music or non-music audio data, the linear classifier 116 determines a linear separation in space based on the input from one or more detectors. For example, the linear classifier 116 determines a linear plane in space that represents a received audio sample and uses the linear plane to determine whether the received audio sample contains music audio data or non-music audio data.

For example, the linear classifier 116 uses scores from the various detectors, and potentially one or more additional detectors not described above, as feature values to determine whether an audio sample contains music audio data or non-music audio data. The linear classifier 116 may use quadratic expansion on the feature values to determine whether the audio sample contains music audio data or non-music audio data.

In one example, the linear classifier 116 computes the following quadratic feature vector, shown in Table 1, from the detector scores, where each of the feature values fv represents one of the detector scores. The linear classifier 116 may use the result of the quadratic feature vector shown in Table 1 to determine whether an audio sample contains music audio data or non-music audio data.

TABLE 1

$$\begin{aligned}
\text{quadratic\_feature\_vector} = [\\
& fv_0, fv_1, \ldots, fv_{(n-1)}, fv_n,\\
& fv_0^2, fv_1^2, \ldots, fv_{(n-1)}^2, fv_n^2,\\
& fv_0*fv_1, fv_0*fv_2, \ldots, fv_0*fv_{(n-1)}, fv_0*fv_n,\\
& fv_1*fv_2, fv_1*fv_3, \ldots, fv_1*fv_{(n-1)}, fv_1*fv_n,\\
& \ldots\\
& fv_{(n-2)}*fv_{(n-1)}, fv_{(n-2)}*fv_n,\\
& fv_{(n-1)}*fv_n]
\end{aligned}$$

In some implementations, the linear classifier 116 uses a plurality of quadratic feature vectors as training data. For example, for a specific audio sample that has been classified as containing music audio data or non-music audio data, the linear classifier receives the output from the various detectors for the specific audio sample, generates a quadratic feature vector for the specific audio sample, and uses an indication of whether or not the specific audio sample contains music audio data or non-music audio data to learn how to classify other audio samples. During training, the linear classifier 116 may repeat this process for a predetermined number of difference audio samples.

The linear classifier 116 may use any appropriate algorithm to combine the input from one or more detectors and determine whether an audio sample contains music audio data or non-music audio data. For example, the linear classifier 116 may use the beat pitch score to determine whether the audio sample contains music audio data or non-music audio data without modifying or combining the beat pitch score with another score. In another example, the linear classifier 116 uses another machine learning algorithm to determine whether the audio sample contains music audio data or non-music audio data.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

The systems and techniques described here may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the systems and techniques described here, or any combination of such back end, middleware, or front end components. The components of the system may be interconnected by any form or medium of digital data communication, e.g., a communication network. Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Figure 18:
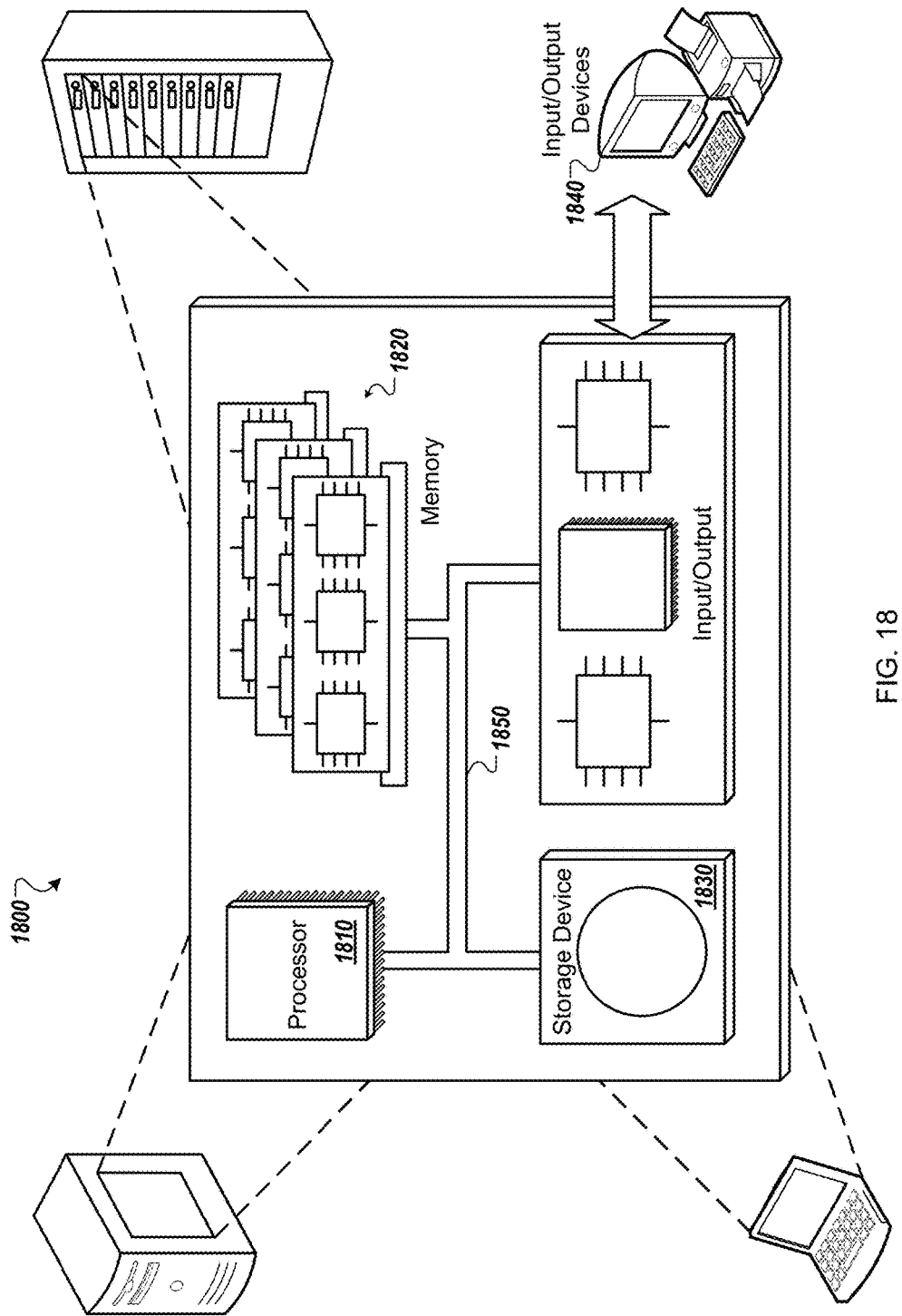
FIG. 18 is a block diagram of a computing system that can be used in connection with computer-implemented methods described in this document.

An example of one such type of computer is shown in FIG. 18, which shows a schematic diagram of a generic computer system 1800. The system 1800 can be used for the operations described in association with any of the computer-implement methods described previously, according to one implementation. The system 1800 includes a processor 1810, a memory 1820, a storage device 1830, and an input/output device 1840. Each of the components 1810, 1820, 1830, and 1840 are interconnected using a system bus 1850. The processor 1810 is capable of processing instructions for execution within the system 1800. In one implementation, the processor 1810 is a single-threaded processor. In another implementation, the processor 1810 is a multi-threaded processor. The processor 1810 is capable of processing instructions stored in the memory 1820 or on the storage device 1830 to display graphical information for a user interface on the input/output device 1840.

The memory 1820 stores information within the system 1800. In one implementation, the memory 1820 is a computer-readable medium. In one implementation, the memory 1820 is a volatile memory unit. In another implementation, the memory 1820 is a non-volatile memory unit.

The storage device 1830 is capable of providing mass storage for the system 1800. In one implementation, the storage device 1830 is a computer-readable medium. In various different implementations, the storage device 1830 may be a floppy disk device, a hard disk device, an optical disk device, or a tape device.

The input/output device 1840 provides input/output operations for the system 1800. In one implementation, the input/output device 1840 includes a keyboard and/or pointing device. In another implementation, the input/output device 1840 includes a display unit for displaying graphical user interfaces.

While this disclosure includes some specifics, these should not be construed as limitations on the scope of the disclosure or of what may be claimed, but rather as descriptions of features of example implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A computer implemented method comprising:
   receiving, by an audio classification system, an audio sample that is associated with audio data;
   computing, by the audio classification system, a spectrogram of the received audio sample;
   detecting, by the audio classification system, one or more beats in the spectrogram;
   detecting, by the audio classification system, one or more sustained pitches in the spectrogram around the beats;
   determining, by the audio classification system for each of the one or more beats, a score based on the sustained pitches around the respective beat using the spectrogram;
   determining, by the audio classification system using the respective score for each of the one or more beats, a beat pitch score that indicates a likelihood that the audio sample contains music audio data;
   determining, by the audio classification system, whether the beat pitch score satisfies a beat pitch threshold; and
   classifying, by the audio classification system, the audio sample as containing music audio data or not containing music audio data based on determining whether the beat pitch score satisfies the beat pitch threshold.

2. The method of claim 1, wherein detecting the one or more beats in the spectrogram comprises:
   determining one or more horizontal peaks in the spectrogram;
   generating a sparse representation of the spectrogram based on the horizontal peaks; and
   detecting the one or more beats in the sparse spectrogram.

3. The method of claim 2, wherein detecting the one or more sustained pitches in the spectrogram around the beats comprises:
   determining one or more vertical peaks in the spectrogram; and
   detecting the one or more sustained pitches in the spectrogram around the beats based on the vertical peaks in the spectrogram around the beats.

4. The method of claim 3, further comprising:
   determining that the audio sample contains music audio data based on the beat pitch score satisfying the beat pitch threshold, classifying the audio sample as containing music audio data or not containing music audio data based on determining whether the beat pitch score satisfies the beat pitch threshold comprises classifying the audio sample as containing music audio data in response to determining that the audio sample contains music audio data.

5. The method of claim 3, wherein determining, for each of the one or more beats, the score based on the sustained pitches around the beat using the spectrogram comprises:
   determining, for each of the one or more beats using the spectrogram, a window that is centered on the respective beat, each window having a predetermined width in time, each of the predetermined widths in time being the same;
   determining, for each of the windows, a quantity of vertical peaks in the window; and
   determining, for each of the one or more beats, a highest score associated with the beat, the highest score based on a highest quantity of vertical peaks in one of the windows associated with the beat;
   wherein the score for each of the one or more beats comprises the highest score for the beat.

6. A non-transitory computer storage medium encoded with instructions that, when executed by one or more computers, cause the one or more computers to perform operations comprising:
   receiving, by an audio classification system, an audio sample that is associated with audio data;
   computing, by the audio classification system, a spectrogram of the received audio sample;
   detecting, by the audio classification system, one or more beats in the spectrogram;
   detecting, by the audio classification system, one or more sustained pitches in the spectrogram around the beats;
   determining, by the audio classification system for each of the one or more beats, a score based on the sustained pitches around the respective beat using the spectrogram;
   determining, by the audio classification system using the respective score for each of the one or more beats, a beat pitch score that indicates a likelihood that the audio sample contains music audio data;

determining, by the audio classification system, whether the beat pitch score satisfies a beat pitch threshold; and classifying, by the audio classification system, the audio sample as containing music audio data or not containing music audio data based on determining whether the beat pitch score satisfies the beat pitch threshold.

7. The computer storage medium of claim 6, wherein detecting the one or more beats in the spectrogram comprises:

determining one or more horizontal peaks in the spectrogram;

generating a sparse representation of the spectrogram based on the horizontal peaks; and detecting the one or more beats in the sparse spectrogram.

8. The computer storage medium of claim 7, wherein detecting the one or more sustained pitches in the spectrogram around the beats comprises:

determining one or more vertical peaks in the spectrogram; and detecting the one or more sustained pitches in the spectrogram around the beats based on the vertical peaks in the spectrogram around the beats.

9. The computer storage medium of claim 8, the operations further comprising:

determining that the audio sample contains music audio data based on the beat pitch score satisfying the beat pitch threshold, classifying the audio sample as containing music audio data or not containing music audio data based on determining whether the beat pitch score satisfies the beat pitch threshold comprises classifying the audio sample as containing music audio data in response to determining that the audio sample contains music audio data.

10. The computer storage medium of claim 8, wherein determining, for each of the one or more beats, the score based on the sustained pitches around the beat using the spectrogram comprises:

determining, for each of the one or more beats using the spectrogram, a window that is centered on the respective beat, each window having a predetermined width in time, each of the predetermined widths in time being the same;

determining, for each of the windows, a quantity of vertical peaks in the window; and determining, for each of the one or more beats, a highest score associated with the beat, the highest score based on a highest quantity of vertical peaks in one of the windows associated with the beat;

wherein the score for each of the one or more beats comprises the highest score for the beat.

11. An audio classification system comprising:

one or more computers and one or more storage devices storing instructions that are operable, when executed by the one or more computers, to cause the one or more computers to perform operations comprising:

receiving an audio sample that is associated with audio data;

computing a spectrogram of the received audio sample;

detecting one or more beats in the spectrogram;

detecting one or more sustained pitches in the spectrogram around the beats;

determining, for each of the one or more beats, a score based on the sustained pitches around the respective beat using the spectrogram;

determining, using the respective score for each of the one or more beats, a beat pitch score that indicates a likelihood that the audio sample contains music audio data;

determining whether the beat pitch score satisfies a beat pitch threshold; and classifying the audio sample as containing music audio data or not containing music audio data based on determining whether the beat pitch score satisfies the beat pitch threshold.

12. The system of claim 11, wherein detecting the one or more beats in the spectrogram comprises:

determining one or more horizontal peaks in the spectrogram;

generating a sparse representation of the spectrogram based on the horizontal peaks; and detecting the one or more beats in the sparse spectrogram.

13. The system of claim 12, wherein detecting the one or more sustained pitches in the spectrogram around the beats comprises:

determining one or more vertical peaks in the spectrogram; and detecting the one or more sustained pitches in the spectrogram around the beats based on the vertical peaks in the spectrogram around the beats.

14. The system of claim 13, the operations further comprising:

determining that the audio sample contains music audio data based on the beat pitch score satisfying the beat pitch threshold, classifying the audio sample as containing music audio data or not containing music audio data based on determining whether the beat pitch score satisfies the beat pitch threshold comprises classifying the audio sample as containing music audio data in response to determining that the audio sample contains music audio data.

15. The system of claim 13, wherein determining, for each of the one or more beats, the score based on the sustained pitches around the beat using the spectrogram comprises:

determining, for each of the one or more beats using the spectrogram, a window that is centered on the respective beat, each window having a predetermined width in time, each of the predetermined widths in time being the same;

determining, for each of the windows, a quantity of vertical peaks in the window; and determining, for each of the one or more beats, a highest score associated with the beat, the highest score based on a highest quantity of vertical peaks in one of the windows associated with the beat;

wherein the score for each of the one or more beats comprises the highest score for the beat.

16. A computer implemented method comprising:

receiving, by an audio classification system, an audio sample that is associated with audio data;

computing, by the audio classification system, a spectrogram of the received audio sample;

determining, by the audio classification system, an average spectral envelope of the spectrogram that is a curve in the frequency-amplitude plane of the spectrogram;

determining, by the audio classification system, one or more differences between adjacent values in the average spectral envelope;

determining, by the audio classification system using the differences between adjacent values in the average spectral envelope, a spectral fluctuation score that indicates a likelihood that the audio sample contains music audio data;

determining, by the audio classification system, whether the spectral fluctuation score satisfies a threshold score; and classifying, by the audio classification system, the audio sample as containing music audio data or not containing music audio data based on determining whether on the spectral fluctuation score satisfies the threshold score.

17. The method of claim 16, wherein determining, using the differences between adjacent values in the average spectral envelope, the spectral fluctuation score that indicates the likelihood that the audio sample contains music audio data comprises determining a mean of the one or more differences between adjacent values in the average spectral envelope.

18. The method of claim 17, wherein determining the mean of the one or more differences between adjacent values in the average spectral envelope comprises determining the mean of the absolute values of the differences between adjacent values in the average spectral envelope.

19. The method of claim 18, further comprising:
approximating a first derivative of the average spectral envelope in the frequency dimension;
wherein determining the one or more differences between adjacent values in the average spectral envelope comprises determining the one or more differences between adjacent values in the average spectral envelope based on the first derivative of the average spectral envelope.

20. The method of claim 16, further comprising:
determining an average squared magnitude of the audio sample; and
comparing the average squared magnitude of the audio sample to a threshold value;
wherein computing the spectrogram is based on determining that the average squared magnitude of the audio sample is greater than the threshold value.

21. A non-transitory computer storage medium encoded with instructions that, when executed by one or more computers, cause the one or more computers to perform operations comprising:
receiving, by an audio classification system, an audio sample that is associated with audio data;
computing, by the audio classification system, a spectrogram of the received audio sample;
determining, by the audio classification system, an average spectral envelope of the spectrogram that is a curve in the frequency-amplitude plane of the spectrogram;
determining, by the audio classification system, one or more differences between adjacent values in the average spectral envelope;
determining, by the audio classification system using the differences between adjacent values in the average spectral envelope, a spectral fluctuation score that indicates a likelihood that the audio sample contains music audio data;
determining, by the audio classification system, whether the spectral fluctuation score satisfies a threshold score; and
classifying, by the audio classification system, the audio sample as containing music audio data or not containing music audio data based on determining whether on the spectral fluctuation score satisfies the threshold score.

22. The computer storage medium of claim 21, wherein determining, using the differences between adjacent values in the average spectral envelope, the spectral fluctuation score that indicates the likelihood that the audio sample contains music audio data comprises determining a mean of the one or more differences between adjacent values in the average spectral envelope.

23. The computer storage medium of claim 22, wherein determining the mean of the one or more differences between adjacent values in the average spectral envelope comprises determining the mean of the absolute values of the differences between adjacent values in the average spectral envelope.

24. The computer storage medium of claim 23, the operations further comprising:
approximating a first derivative of the average spectral envelope in the frequency dimension;
wherein determining the one or more differences between adjacent values in the average spectral envelope comprises determining the one or more differences between adjacent values in the average spectral envelope based on the first derivative of the average spectral envelope.

25. The computer storage medium of claim 21, the operations further comprising:
determining an average squared magnitude of the audio sample; and
comparing the average squared magnitude of the audio sample to a threshold value;
wherein computing the spectrogram is based on determining that the average squared magnitude of the audio sample is greater than the threshold value.

26. An audio classification system comprising:
one or more computers and one or more storage devices storing instructions that are operable, when executed by the one or more computers, to cause the one or more computers to perform operations comprising:
receiving an audio sample that is associated with audio data;
computing a spectrogram of the received audio sample;
determining an average spectral envelope of the spectrogram that is a curve in the frequency-amplitude plane of the spectrogram;
determining one or more differences between adjacent values in the average spectral envelope;
determining, using the differences between adjacent values in the average spectral envelope, a spectral fluctuation score that indicates a likelihood that the audio sample contains music audio data;
determining whether the spectral fluctuation score satisfies a threshold score; and
classifying the audio sample as containing music audio data or not containing music audio data based on determining whether on the spectral fluctuation score satisfies the threshold score.

27. The system of claim 26, wherein determining, using the differences between adjacent values in the average spectral envelope, the spectral fluctuation score that indicates the likelihood that the audio sample contains music audio data comprises determining a mean of the one or more differences between adjacent values in the average spectral envelope.

28. The system of claim 27, wherein determining the mean of the one or more differences between adjacent values in the average spectral envelope comprises determining the mean of the absolute values of the differences between adjacent values in the average spectral envelope.

29. The system of claim 28, the operations further comprising:
- approximating a first derivative of the average spectral envelope in the frequency dimension;
- wherein determining the one or more differences between adjacent values in the average spectral envelope comprises determining the one or more differences between adjacent values in the average spectral envelope based on the first derivative of the average spectral envelope.

30. The system of claim 26, the operations further comprising:
- determining an average squared magnitude of the audio sample; and
- comparing the average squared magnitude of the audio sample to a threshold value;
- wherein computing the spectrogram is based on determining that the average squared magnitude of the audio sample is greater than the threshold value.

\* \* \* \* \*

UNITED STATES PATENT AND TRADEMARK OFFICE
CERTIFICATE OF CORRECTION

| | | |
|---|---|---|
| PATENT NO. | : 10,424,321 B1 | Page 1 of 1 |
| APPLICATION NO. | : 13/932158 | |
| DATED | : September 24, 2019 | |
| INVENTOR(S) | : Sharifi et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1621 days.

Signed and Sealed this
Seventh Day of July, 2020

Andrei Iancu
*Director of the United States Patent and Trademark Office*